(12) United States Patent
Schrum, Jr. et al.

(10) Patent No.: US 8,995,443 B2
(45) Date of Patent: Mar. 31, 2015

(54) ADDRESS RESOLUTION MECHANISM FOR HYBRID COMMUNICATION NETWORKS

(75) Inventors: Sidney Brower Schrum, Jr., Ocala, FL (US); Lawrence W. Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 13/563,284

(22) Filed: Jul. 31, 2012

(65) Prior Publication Data
US 2014/0036917 A1 Feb. 6, 2014

(51) Int. Cl.
H04L 12/56 (2006.01)
H04L 12/54 (2013.01)
H04L 29/12 (2006.01)

(52) U.S. Cl.
CPC .......... *H04L 12/5692* (2013.01); *H04L 61/103* (2013.01); *H04L 61/6077* (2013.01)
USPC ........................................................ 370/392

(58) Field of Classification Search
CPC ..... H04L 45/00; H04L 29/0653; H04L 47/10; H04L 29/06
USPC ........................................................ 370/328
See application file for complete search history.

(56) References Cited

U.S. PATENT DOCUMENTS

| | | | |
|---|---|---|---|
| 5,208,811 A * | 5/1993 | Kashio et al. ................ | 370/401 |
| 6,618,398 B1 | 9/2003 | Marchetti et al. | |
| 2003/0021274 A1 | 1/2003 | Siikaniemi et al. | |
| 2006/0274752 A1 * | 12/2006 | Jain et al. ....................... | 370/392 |
| 2008/0101381 A1 | 5/2008 | Sun et al. | |
| 2011/0164527 A1 * | 7/2011 | Mishra et al. ................. | 370/252 |
| 2012/0089714 A1 | 4/2012 | Carley | |

FOREIGN PATENT DOCUMENTS

| | | |
|---|---|---|
| CN | 101674286 A | 3/2010 |
| CN | 101883160 A | 11/2010 |
| WO | 2014065914 | 5/2014 |

OTHER PUBLICATIONS

"PCT Application No. PCT/US2013/052560 International Search Report", Jul. 1, 2014, 14 pages.

(Continued)

*Primary Examiner* — Andrew Lai
*Assistant Examiner* — Jamaal Henson
(74) *Attorney, Agent, or Firm* — DeLizio Gilliam, PLLC

(57) ABSTRACT

A hybrid device can execute hybrid ARP functionality to manage one-to-many associations between a single network layer address and multiple link layer addresses of other hybrid devices. In accordance with the hybrid ARP functionality, the hybrid device can determine a transmission route, a corresponding one of a plurality of network interfaces of a destination hybrid device, and a corresponding one of a plurality of link layer addresses of the destination hybrid device, based on address resolution store entries associated with the destination hybrid device. The identified link layer address can be populated in a frame for transmission to the destination hybrid device. Additionally, the hybrid ARP functionality can be configured to operate in conjunction with conventional ARP functionality implemented by upper protocol layers. The hybrid ARP functionality can serve as a "proxy" between the conventional ARP functionality and one or more hybrid devices of the hybrid communication network.

39 Claims, 7 Drawing Sheets

(56) References Cited

OTHER PUBLICATIONS

Anonymous, "Definition of hybrid devices?", XP055122907, Dec. 31, 2010, 2 pages.

Aust, et al., "Enhanced Link-Status Detection for High Speed Link Aggregation in Cognitive Radio Networks", XP001515478, Jul. 1, 2008, pp. 1609-1615.

Brzozowski, "Seventh Framework Programme Theme 3—Information Communication Technologies (ICT)—WP5 Report—Inter-MAC implementation documentation", XP055120431, Jul. 8, 2011, 63 pages.

Tanenbaum, "Computer Networks, The Address Resolution Protocol", XP002222724, Jan. 1, 1996, pp. 420-423.

"PCT Application No. PCT/US2013/052560 Written Opinion", Nov. 18, 2014, 8 pages.

"PCT Application No. PCT/US2013/052560 International Preliminary Report on Patentability", Jan. 20, 2015, 9 pages.

\* cited by examiner

ADDRESS RESOLUTION MECHANISM FOR HYBRID COMMUNICATION NETWORKS

BACKGROUND

Embodiments of the inventive subject matter generally relate to the field of communication networks and, more particularly, to an address resolution mechanism for hybrid communication networks.

Hybrid communication networks typically comprise multiple networking technologies (e.g., wireless local area network (WLAN) technologies, powerline communication technologies, Ethernet, etc.). Typically, the communication mechanisms and protocol specifics (e.g., device and topology discovery, bridging to other networks, etc.) are unique to each networking technology. The multiple networking technologies are typically interconnected using bridging-capable devices that forward frames between the different network technologies and media to form a single, extended communication network. Hybrid communication networks typically present multiple frame delivery routes between any two hybrid devices.

SUMMARY

Various embodiments of an address resolution mechanism in hybrid communication networks are disclosed. In one embodiment, a first hybrid device of a communication network determines that a message is scheduled to be transmitted from the first hybrid device to a second hybrid device of the communication network. The first hybrid device and the second hybrid devices are each associated with a plurality of network interfaces. The first hybrid device determines a transmission route for the message and a corresponding first network interface associated with the second hybrid device based, at least in part, on one or more address resolution store entries associated with the second hybrid device. The first hybrid device determines a first link layer address that corresponds to the first network interface associated with the second hybrid device. The second hybrid device is associated with a plurality of link layer addresses each of which is associated with corresponding ones of the plurality of network interfaces. The first hybrid device generates the message including the first link layer address. The first hybrid device transmits the message via the transmission route.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
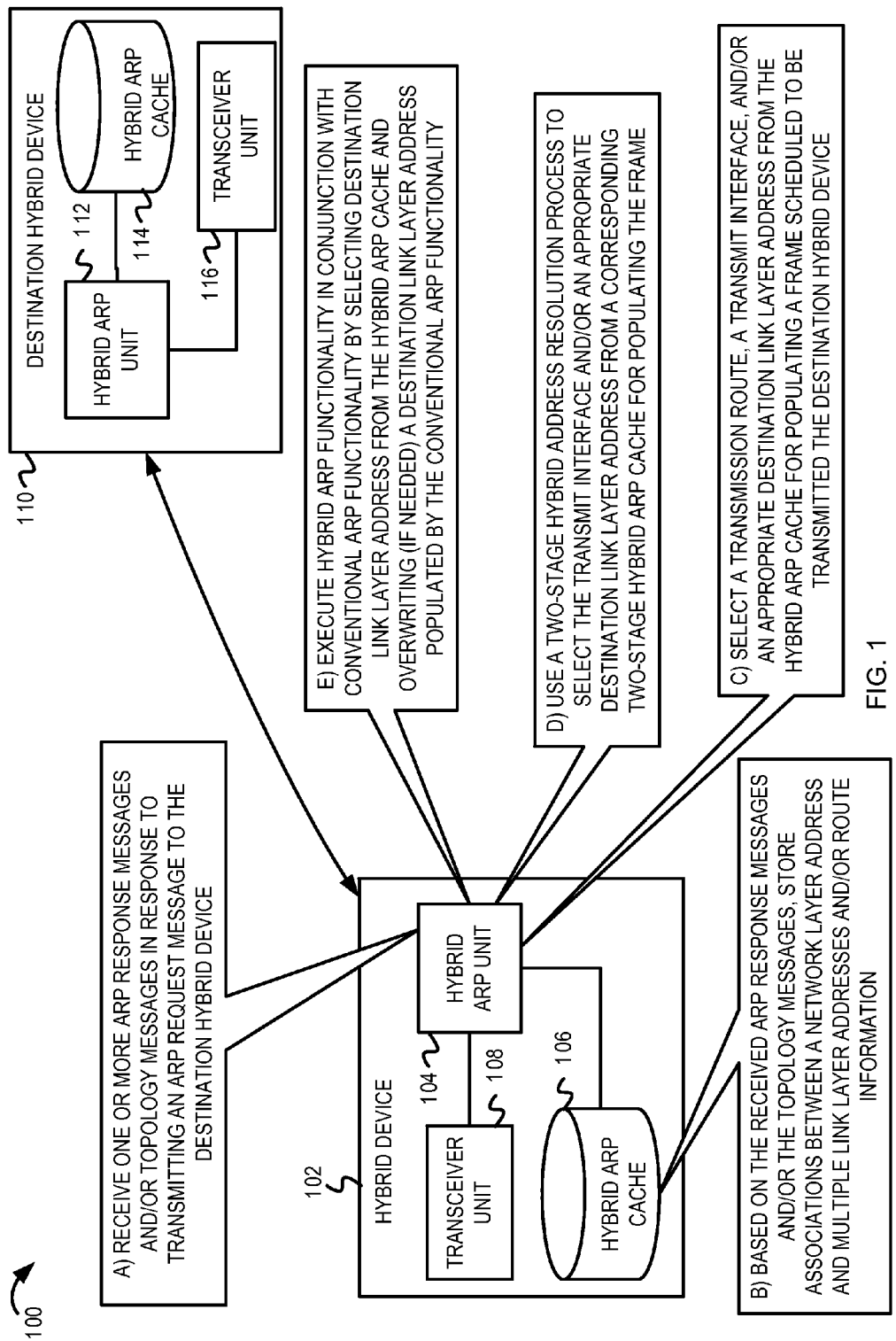
FIG. 1 is a block diagram illustrating a hybrid communication network 100 including a hybrid address resolution mechanism.

The description that follows includes exemplary systems, methods, techniques, instruction sequences, and computer program products that embody techniques of the present inventive subject matter. However, it is understood that the described embodiments may be practiced without these specific details. For instance, although in some embodiments the address resolution mechanisms can be implemented for hybrid communication networks comprising hybrid devices that connect to wireless local area networks (WLANs) (e.g., IEEE 802.11 networks), powerline communication (PLC) networks (e.g., HomePlug AV networks), and Ethernet, embodiments are not so limited. In other embodiments, the address resolution mechanisms described herein can be implemented for hybrid communication networks comprising other suitable types of network devices that implement other standards/protocols (e.g., Multimedia over Coax Alliance (MoCA), WiMAX, etc.). In other instances, well-known instruction instances, protocols, structures, and techniques have not been shown in detail in order not to obfuscate the description.

Conventional communication devices typically have a one-to-one association between a network layer address (e.g. an Internet Protocol version 4 (IPv4) address, an Internet Protocol version 6 (IPv6) address, etc.) and a link layer address (e.g., a medium access control (MAC) address). The conventional communication devices can use address resolution protocol (ARP) techniques to maintain an ARP cache containing these network layer to link layer associations and to resolve link layer addresses prior to transmitting frames. On the other hand, hybrid communication devices comprise multiple interfaces (e.g., Ethernet interface, WLAN interface, PLC interface, etc.) each of which couples the hybrid communication device to a corresponding communication network (e.g., Ethernet, WLAN, powerline network, etc.). Accordingly, the hybrid communication devices typically have a one-to-many association between a single network layer address and multiple link layer addresses. Conventional ARP procedures, ARP messages, and ARP caches are typically configured to handle only a one-to-one association between network layer addresses and link layer addresses. The conventional ARP procedures, ARP messages, and ARP caches may be inadequate to correctly handle the one-to-many association between network layer addresses and link layer addresses of the hybrid communication devices and the hybrid communication networks.

A hybrid device can be configured to execute hybrid ARP functionality for managing one-to-many associations between a single network layer address and multiple link layer addresses of other hybrid devices in a hybrid communication network. In some embodiments, a hybrid networking sub-layer of the hybrid device can comprise a hybrid ARP unit and a corresponding hybrid ARP cache. The hybrid ARP unit can manage address association information for associating a network layer address with one or more link layer addresses in the hybrid communication network. The hybrid ARP unit can use this address association information to resolve addresses and populate the appropriate destination link layer address in a frame scheduled to be transmitted, as will be described below with reference to FIGS. 2 and 4. For each hybrid device in the hybrid communication network, the hybrid ARP cache can comprise multiple data entries, each of which comprises the same network layer address but a different link layer address. Each of the data entries in the hybrid ARP cache can also be associated with transmission route information. The hybrid ARP unit can use the address association information and the corresponding transmission route information to select a destination link layer address and a transmission route for frames scheduled to be transmitted. In some embodiments, the hybrid ARP unit can be configured to implement a two-stage process within the hybrid networking sub-layer for resolving network layer addresses and selecting a transmission routes (and/or a transmit interface), as will be described below in FIG. 5. In some embodiments, the hybrid ARP unit can be configured to operate in conjunction with conventional ARP functionality (implemented by upper protocol layers). As will be further described below in FIGS. 3 and 6, the hybrid ARP unit can act as a "proxy" between the upper protocol layer's conventional ARP functionality and one or more hybrid devices of the hybrid communication network. Executing the hybrid ARP functionality can ensure that the hybrid device has knowledge of the complete mapping of the network layer address to link layer address associations for all the hybrid devices in the hybrid communication network. The hybrid ARP functionality described herein can also help ensure that the one-to-many associations between the network layer address and the link layer addresses are properly handled without interfering with the operations of the conventional ARP functionality (if any).

FIG. 1 is a block diagram illustrating a hybrid communication network 100 including a hybrid address resolution mechanism. The hybrid communication network 100 comprises hybrid devices 102 and 110. In the example, of FIG. 1, the hybrid device 110 is a destination or a target hybrid device. The hybrid device 102 may be a source hybrid device or a forwarding hybrid device. The hybrid device 102 comprises a hybrid ARP unit 104, a hybrid ARP cache 106, and a transceiver unit 108. The destination hybrid device 110 comprises a hybrid ARP unit 112, a hybrid ARP cache 114, and a transceiver unit 116. Although not depicted in FIG. 1, the hybrid devices 102 and 110 can comprise other suitable processing units (e.g., for generating frame scheduled to be transmitted, processing received frames, etc.). In one example, each of the hybrid devices 102 and 110 can comprise a PLC interface, an Ethernet interface, and/or a WLAN interface that enable the hybrid devices to connect to a powerline network, an Ethernet, and a WLAN, respectively. In some implementations, the hybrid devices 102 and 110 can each be an electronic device such as a laptop computer, a tablet computer, a mobile phone, a smart appliance, a gaming console, an access point, or other suitable electronic devices with suitable communication capabilities (e.g., WLAN communication capabilities, powerline communication capabilities, Ethernet communication capabilities, etc.). In some embodiments, in addition to powerline communication protocols, WLAN communication protocols, and Ethernet communication protocols, communication units of the hybrid devices 102 and 110 can implement other protocols and functionality to enable other types of communications (e.g., Bluetooth®, WiMAX, etc.).

Figure 2:
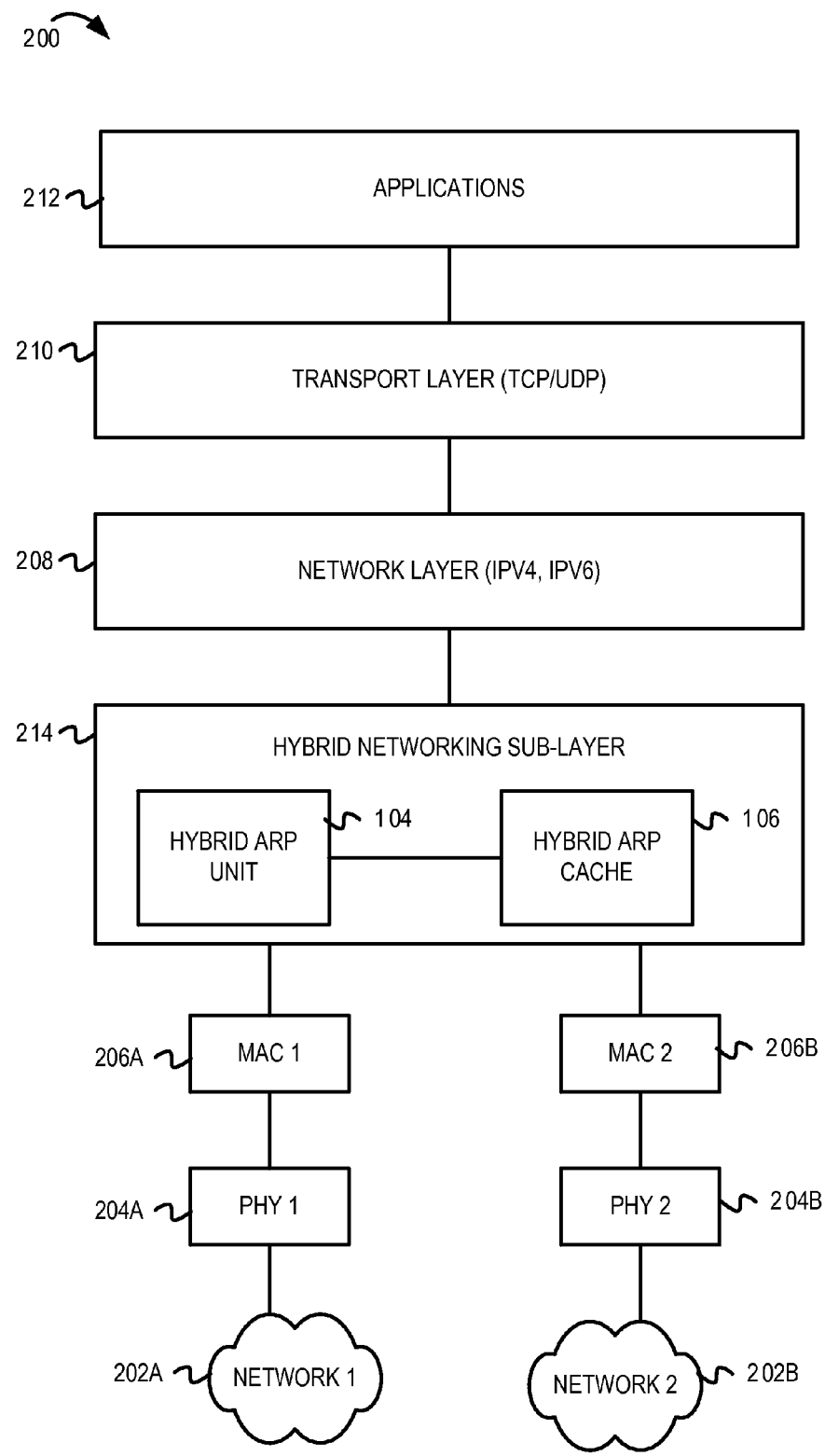
FIG. 2 is an example protocol stack of a hybrid device including hybrid ARP functionality.

In some implementations, the networking functionality of the hybrid device 102 (and also the destination hybrid device 110) can be partitioned into sub-functions using a "layered" approach, consistent with the International Standards Organization (ISO) Open Systems Interconnection (OSI) reference model, as depicted in FIG. 2. The set of networking protocol layers may be referred to as a "protocol stack" 200. The protocol stack 200 is typically divided into "upper protocol layers" and "lower protocol layers." The lower protocol layers include the physical (PHY) layer and the medium access control (MAC) layer. Typically, the number of PHY layers and corresponding MAC layers may be determined based on the number of network interfaces associated with the hybrid device 102. In other words, if the hybrid device 102 comprises two network interfaces, the protocol stack of the hybrid device 102 typically comprises two PHY layers 204A and 204B and corresponding two MAC layers 206A and 206B, as depicted in FIG. 2. The PHY layer 204A and the corresponding MAC layer 206A couples the hybrid device 102 to a communication network 202A. The PHY layer 204B and the corresponding MAC layer 206B couples the hybrid device 102 to a communication network 202B. The upper protocol layers can include a network layer 208 (e.g., implementing an Internet Protocol version 4 (IPv4) communication protocol, an Internet Protocol version 6 (IPv6) communication protocol, an AppleTalk® communication protocol, or other suitable network layer protocol), a transport layer 210 (e.g., transmission control protocol (TCP), user datagram protocol (UDP), or other suitable transport layer protocol depending on the network layer protocol), and one or more applications 212.

The protocol stack 200 of the hybrid device 102 can also comprise a "hybrid networking sub-layer" 214 between the network layer 208 and the MAC layers 206A and 206B. In some implementations, the hybrid networking sub-layer 214 can comprise the hybrid ARP unit 104 and the hybrid ARP cache 106 to execute functionality described below in FIGS. 1 and 4-6. The hybrid networking sub-layer 214 can implement functionality for managing communications in the hybrid device 102 with a single set of upper protocol layers (e.g., a single network layer and a single transport layer) but with multiple network interfaces (e.g., multiple PHY layers and multiple MAC layers). The hybrid networking sub-layer 214 can also enable the upper protocol layers to operate as if the hybrid device 102 comprises only a single MAC layer and a corresponding single PHY layer. It is noted that the protocol stack 200 can comprise other suitable layers or sub-layers, depending on the networking technology and optional protocols that might be implemented. Furthermore, in some embodiments, one or more other sub-layers (singly or in combination with the hybrid networking sub-layer 214) may execute functionality described herein in FIGS. 1-6.

Referring back to FIG. 1, for each of the other hybrid devices of the communication network 100 ("target hybrid device"), the hybrid ARP cache 106 can comprise a network layer address associated with the target hybrid device 110 and one or more link layer addresses (associated with corresponding one or more network interfaces) of the target hybrid device 110. In some embodiments, each target hybrid device 110 in the communication network 100 can have a unique identifier (associated with the hybrid device's hybrid networking sub-layer). The unique identifier can be one of the link layer addresses associated with the target hybrid device 110, a hybrid networking sub-layer identifier (e.g., an IEEE 1905.1 abstraction sub-layer identifier) associated with the target hybrid device 110, etc. Accordingly, for each target hybrid device 110, the hybrid ARP cache 106 can also comprise the unique identifier associated with the hybrid networking sub-layer of the target hybrid device 110. In some embodiments, the hybrid ARP unit 104 can assign a unique identifier to the hybrid networking sub-layer of its hybrid device 102. The hybrid ARP unit 104 may also assign a unique identifier to hybrid networking sub-layers associated with the other target hybrid devices 110 in the communication network 100. In other embodiments, each target hybrid device 110 can determine its own unique identifier and accordingly notify the hybrid device 102 (e.g., the hybrid ARP unit 104) and other hybrid devices of the communication network 100. The hybrid ARP unit 104 can use these unique identifiers associated with each target hybrid device 110 in the communication network 100 to facilitate cache entry/lookup and ARP message transmission/parsing. In some embodiments, each link layer address of each target hybrid device 110 may also be associated with network topology information, route metric information, and previously selected route information specific to classes of transmit frames. In addition to the network layer address and the corresponding one or more link layer addresses, the hybrid ARP unit 104 can also store network topology information, transmission route information, and/or route metric information in the hybrid ARP cache 106. The hybrid ARP unit 104 can use this network topology information, transmission route information, and/or route metric information for selecting the appropriate link layer addresses to be populated in frames scheduled to be transmitted to other devices in the communication network 100.

Figure 4:
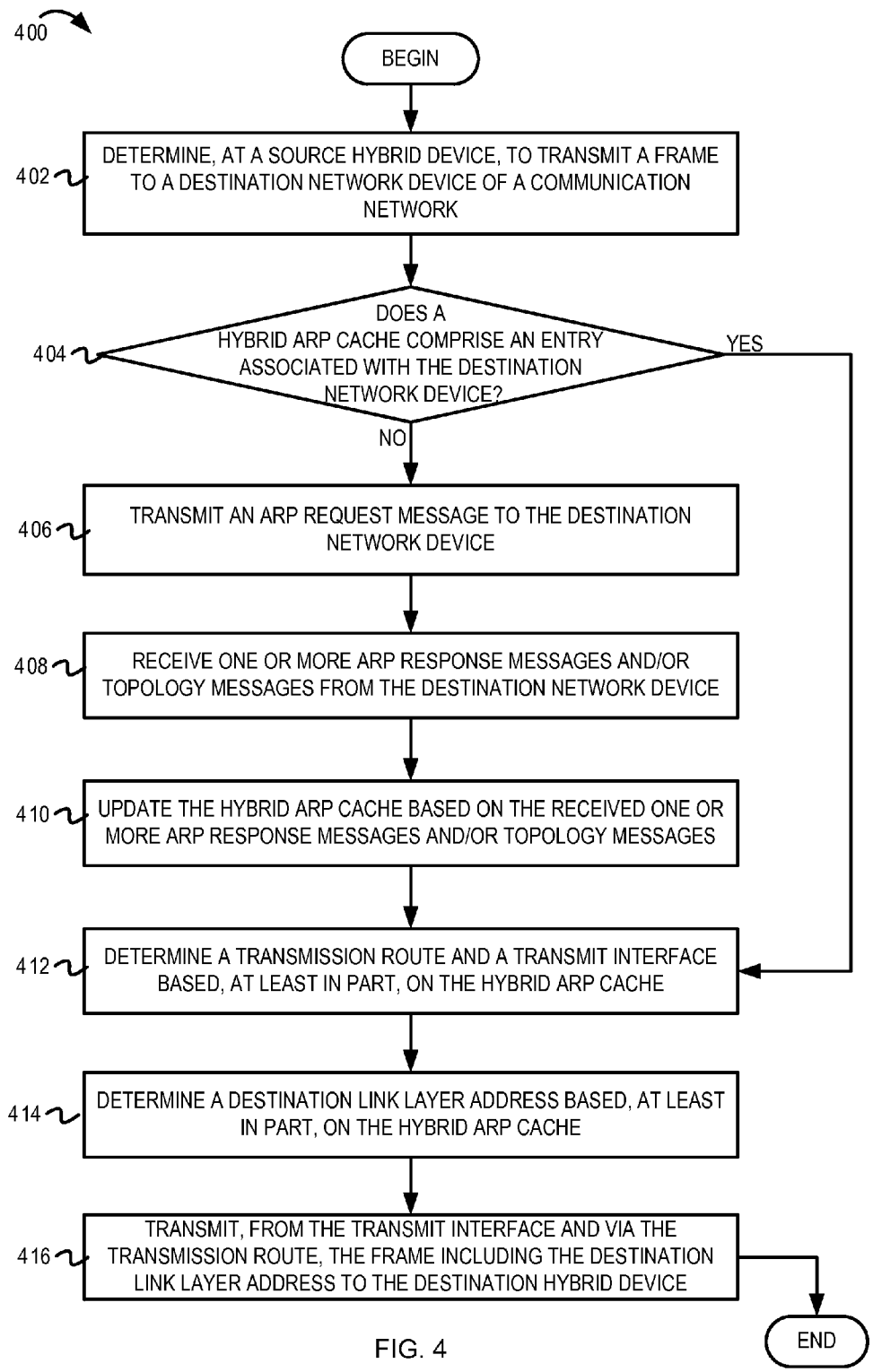
FIG. 4 is a flow diagram illustrating example operations of a hybrid device populating a hybrid ARP cache and using the hybrid ARP cache to transmit a frame to a destination network device.

As will further be described in FIG. 4, the hybrid ARP unit 104 can maintain the hybrid ARP cache 106 by using a combination of ARP messages and topology messages. With reference to FIG. 1, the hybrid ARP unit 104 can transmit an ARP request message comprising the network layer address of the destination hybrid device 110. At stage A, the hybrid ARP unit 104 receives one or more ARP response messages and/or topology messages from the destination hybrid device 110 (e.g., from the hybrid ARP unit 112) in response to transmitting the ARP request message. At stage B, the hybrid ARP unit 104 can update the hybrid ARP cache 106, store associations between a network layer address and one or more link layer addresses of the destination hybrid device 110, and/or store route information associated with one or more of the link layer addresses of the destination hybrid device 110. In other words, based on the ARP response messages and/or the topology messages received at stage A, the hybrid ARP unit 104 can update the hybrid ARP cache 106 with entry(s) for populating the destination link layer address in a frame scheduled to be transmitted to the destination hybrid device 110. The ARP cache entries can include the network layer address associated with the destination hybrid device 110, one or more link layer addresses associated with corresponding one or more network interfaces of the destination hybrid device 110, a preferred transmission route associated with each of the link layer addresses of the destination hybrid device 110, a previously used transmission route associated with each of the link layer addresses of the destination hybrid device 110, route metrics associated with each of the transmission routes for communicating with the destination hybrid device 110, etc. At stage C, the hybrid ARP unit 104 can select (e.g., based on the route metric information, the transmission route information, the address association information, and/or other information in the hybrid ARP cache 106) a transmission route, a transmit interface, and/or an appropriate destination link layer interface for communicating with the destination hybrid device 110. The hybrid ARP unit 104 can populate the frame accordingly and transmit the frame via the selected transmit interface to the destination hybrid device 110. Operations of the hybrid ARP unit 104 for populating the hybrid ARP cache 106 and selecting an optimal transmit interface, destination link layer address, and/or transmission route are further described below with reference to FIG. 4.

In some embodiments, functionality of the hybrid ARP unit 104 can be split across two hybrid address resolution stages and the hybrid ARP cache 106 can be implemented as a two-stage cache. As will be further described below in FIG. 5, the two hybrid address resolution stages can, in conjunction, select the transmit interface and/or the destination link layer address from the two-stage hybrid ARP cache for populating the frame (stage D). More specifically, for each target device (whether a target hybrid device or a target legacy device), a first stage hybrid ARP cache can comprise a single entry comprising a network layer address of the target device and one link layer address of the target device (irrespective of whether the target device is a legacy device or a hybrid device). As discussed above, the target hybrid device can comprise multiple network interfaces each of which connect the target hybrid device to correspond multiple communication networks. The target legacy device comprises only one network interface that couples the target legacy device to a single communication network. For a target hybrid device, the entry in the first stage hybrid ARP cache can indicate an association between the network layer address of the target hybrid device and a hybrid networking sub-layer identifier of the target hybrid device. Based on knowledge of the network layer address associated with the target hybrid device, the first hybrid address resolution stage can locate an entry (of the first stage hybrid ARP cache) that comprises the network layer address associated with the target hybrid device and a corresponding link layer address. The first hybrid address resolution stage can populate the destination link layer address field in the frame using the link layer address retrieved from the first stage hybrid ARP cache. Next, the second hybrid address resolution stage can use the link layer address in the frame (determined by the first hybrid address resolution stage) as a pointer to locate one or more matching entries in the one or more databases of a second stage hybrid ARP cache. The second hybrid address resolution stage can select a transmission route and the appropriate destination link layer address. If the destination link layer address selected by the second hybrid address resolution stage is different from the destination link layer address populated in the frame by the first hybrid address resolution stage, the link layer address in the frame is overwritten with the link layer address selected by the second hybrid address resolution stage.

It is noted that in some embodiments, the first hybrid address resolution stage and the second hybrid address resolution stage can be implemented as part of the hybrid ARP unit 104. In other embodiments, the first hybrid address resolution stage and the second hybrid address resolution stage can be implemented by distinct processing units that are communicatively coupled with each other. In some embodiments, the first stage hybrid ARP cache and the second stage hybrid ARP cache can be implemented as part of the hybrid ARP cache 106. In another embodiment, the first stage hybrid ARP cache and the second stage hybrid ARP cache can be implemented on different computer systems, servers, etc. In some embodiments, the first stage hybrid ARP cache and the second stage hybrid ARP cache can be implemented as part of the first hybrid address resolution stage and the second hybrid address resolution stage respectively. In other embodiments, first stage hybrid ARP cache may be distinct from (and may be coupled with) first hybrid address resolution stage; while the second stage hybrid ARP cache may be distinct from (and coupled with) the second hybrid address resolution stage. Operations of the two-stage process for resolving network layer addresses and for selecting a transmission route and/or a transmit interface for frame delivery are further described in FIG. 5.

Figure 3:
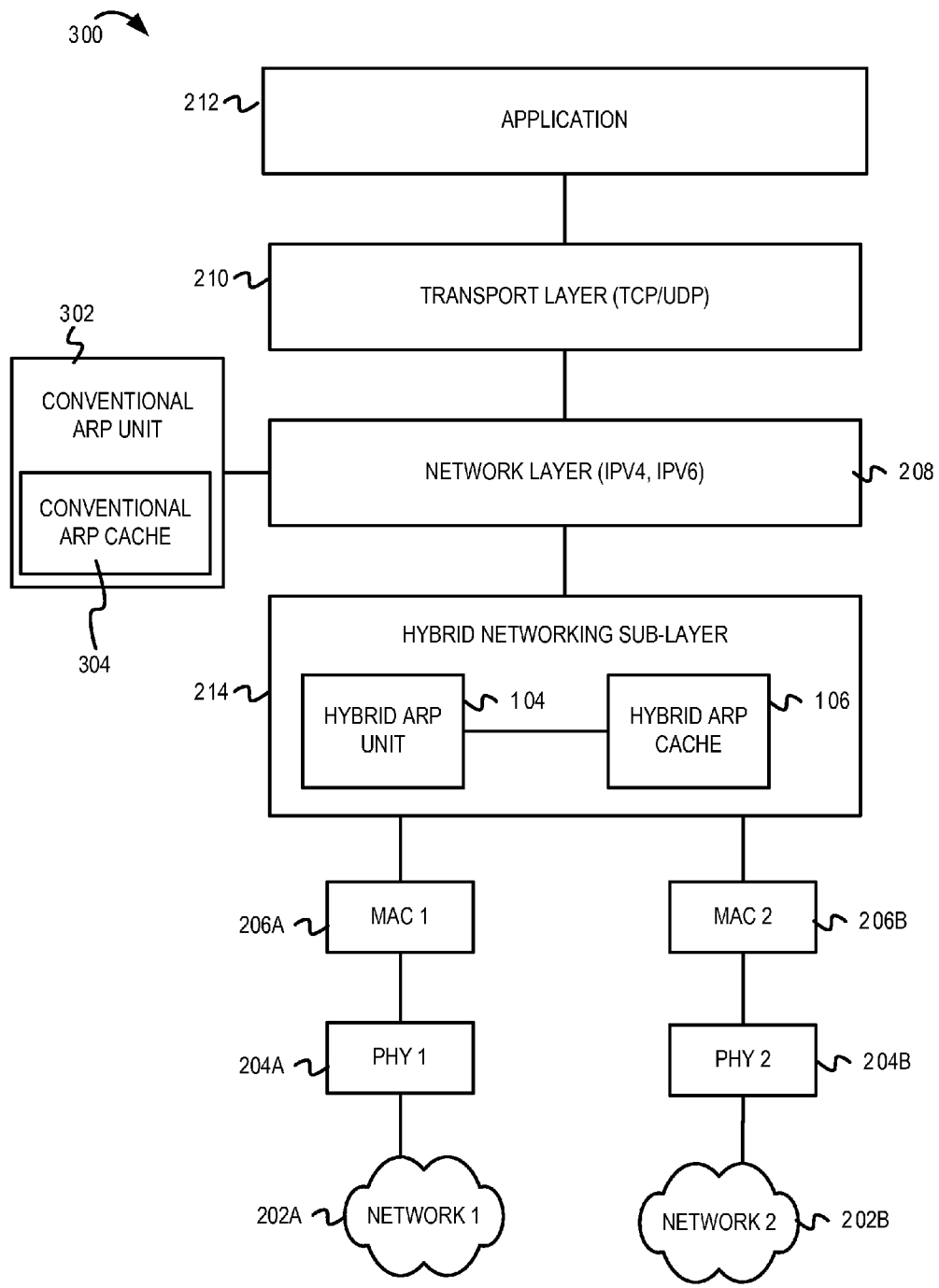
FIG. 3 is an example protocol stack of a hybrid device for integrating conventional ARP functionality with hybrid ARP functionality.

In some embodiments, existing/conventional ARP functionality of the upper protocol layers may not be disabled/removed to implement the hybrid ARP functionality. Instead, the hybrid ARP unit 104 can execute hybrid ARP functionality in conjunction with conventional ARP functionality by selecting a destination link layer address from the hybrid ARP cache and overwriting (if needed) a destination link layer address populated by the conventional ARP functionality (stage E). More specifically, as depicted by protocol stack 300 of FIG. 3, the hybrid ARP unit 104 and the hybrid ARP cache 106 may operate in conjunction with a conventional ARP unit 302 and a conventional ARP cache 304. In FIG. 3, the upper protocol layer (e.g., the network layer 208) of the hybrid device 102 is associated with (e.g., comprises or is coupled with) the conventional ARP unit 302 and the conventional ARP cache 304. The conventional ARP unit 302 is typically not configured to manage hybrid devices with multiple link layer addresses. Therefore, the conventional ARP unit 302 maintains (in the conventional ARP cache 304) a one-to-one association between a network layer address and a link layer address for each network device in the communication network 100 (irrespective of whether the network device is a legacy device or a hybrid device). The hybrid ARP unit 104 can act as a "proxy" for the conventional ARP unit 302 so that the upper protocol layers 208, 210, and 212 are unaware of and unaffected by the hybrid nature of the underlying communication network 100, hybrid devices 102 and 110 that implement multiple network interfaces, and the one-to-many associations between a single network layer address and multiple link layer addresses. The hybrid ARP unit 104 can intercept ARP request messages presented by the conventional ARP unit 302, ARP request messages received from other hybrid/legacy devices, ARP announcement messages (or ARP response messages) generated by the conventional ARP unit 302, and ARP announcement messages received from other hybrid/legacy devices. As will be further described below in FIG. 6, the hybrid ARP unit 104 can A) discard or alter ARP request messages generated by the conventional ARP unit 302, B) discard or alter received ARP announcement messages prior to providing them to the conventional ARP unit 302, C) generate ARP request messages and transmit these ARP request messages via multiple network interfaces of the hybrid device 102, and/or D) generate ARP announcement messages to be presented only to the conventional ARP unit 302 based on received ARP response messages and/or topology messages.

It is noted that the stages A-E depicted in FIG. 1 may not be sequential and in some embodiments, only a subset of the stages depicted in FIG. 1 may be executed. In one example, stages A and B may be executed only if the hybrid device 102 receives ARP response messages (or ARP announcement messages, topology messages, etc.) and/or if the hybrid ARP cache 106 of the hybrid device 102 does not comprise requisite address association information. As another example, the hybrid ARP unit 104 may implement any one of stages C, D, and E. In other words, the hybrid ARP unit 104 may execute 1) a single stage hybrid address resolution process with a single stage hybrid cache to select the destination link layer address (stage C), 2) a dual-stage hybrid address resolution process with a dual-stage hybrid cache to select the destination link layer address (stage D), or 3) single stage hybrid address resolution process with a single stage hybrid cache in conjunction with a conventional address resolution process and a conventional cache to select the destination link layer address (stage E).

FIG. 4 is a flow diagram ("flow") 400 illustrating example operations of a hybrid device populating a hybrid ARP cache and using the hybrid ARP cache to transmit a frame to a destination network device. The flow 400 begins at block 402.

At block 402, a source hybrid device determines to transmit a frame to a destination network device of a communication network. With reference to the example of FIG. 1, the hybrid ARP unit 104 of the source hybrid device 102 can determine that a frame is scheduled to be transmitted to the destination network device 110. As discussed above, the hybrid ARP unit 104 may be implemented as part of a hybrid networking sub-layer 214 of the hybrid device 102. Thus, in some embodiments, an upper protocol layer of the hybrid device 102 may generate the frame and may provide the frame (for transmission) to the hybrid networking sub-layer 214. In other embodiments, the hybrid networking sub-layer 214 may generate a message for transmission to the destination network device 110. As will be further described below in FIG. 4, the hybrid ARP unit 104 can use the hybrid ARP cache 106 to populate an appropriate destination link layer address associated with the destination network device 110 in the frame scheduled to be transmitted. It is noted that the destination network device can be a legacy device or a hybrid device. The flow continues at block 404.

At block 404, it is determined whether the hybrid ARP cache comprises one or more entries associated with the destination network device. For example, the hybrid ARP unit 104 can determine whether the hybrid ARP cache 106 comprises one or more entries associated with the destination network device 110. In some embodiments, the hybrid ARP unit 104 can determine (from the frame scheduled to be transmitted) a network layer address associated with the destination network device 110. The hybrid ARP unit 104 can then determine whether the hybrid ARP cache 106 comprises one or more entries that correspond to the network layer address associated with the destination network device 110. As described above, the hybrid ARP cache 106 may also be implemented as part of the hybrid networking sub-layer 214 of the hybrid device 102. In some embodiments, as depicted above, the hybrid ARP cache 106 can be implemented separate from the hybrid ARP unit 104 but may be communicatively coupled with the hybrid ARP unit 104. In other embodiments, the hybrid ARP cache 106 can be implemented as part of the hybrid ARP unit 104. If the hybrid ARP unit 104 determines that the hybrid ARP cache 106 does not comprise any entries associated with the destination network device 110, the flow continues at block 406. Otherwise, if the hybrid ARP unit 104 determines that the hybrid ARP cache 106 comprises one or more entries associated with the destination network device 110, the flow continues at block 412.

At block 406, the hybrid device transmits an ARP request message to the destination network device. The flow 400 moves from block 404 to block 406 if the hybrid ARP unit 104 determines that the hybrid ARP cache 106 does not comprise any entry/information associated with the network layer address of the destination network device 110. With reference to the example of FIG. 1, the hybrid ARP unit 104 can transmit (via the transceiver unit 108) the ARP request message to the destination network device 110. In some embodiments, the transmitted ARP request message can be a unicast message that comprises the network layer address of the destination network device 110. In some embodiments, if the destination network device is a legacy device and the hybrid ARP unit 104 is "aware" of the communication protocol (e.g., WLAN communication protocol) supported by the legacy device, then the hybrid ARP unit 104 can transmit the ARP request message via an appropriate network interface (e.g., the WLAN interface). If the hybrid ARP unit 104 is "unaware" of the communication protocol supported by the legacy device, if the destination network device is a hybrid device, or if the hybrid ARP unit 104 does not know whether the destination network device is a hybrid or a legacy device, then the hybrid ARP unit 104 can transmit the ARP request message via all of its network interfaces. In some embodiments, the hybrid ARP unit 104 may have knowledge of the location of the destination network device 110 relative to the hybrid device 102. In this embodiment, the hybrid ARP unit 104 may transmit the ARP request message via one (or a subset) of the network interfaces of the hybrid device 102. The flow continues at block 408.

At block 408, one or more ARP response messages and/or topology messages are received from the destination network device. For example, the hybrid ARP unit 104 can receive one or more ARP response messages and/or topology messages from the destination network device 110. In some embodiments, if the destination network device 110 is a legacy device, the hybrid ARP unit 104 may receive (from the destination network device 110) only one ARP response message indicating the network layer address and a corresponding single link layer address. In this embodiment, the hybrid ARP unit 104 may not receive a topology message from the destination network device 110. In another embodiment, if the destination network device 110 is a hybrid device, the hybrid ARP unit 104 may receive (from the destination network device 110) multiple ARP response messages for corresponding multiple link layer addresses associated with the destination network device 110. In other words, for each link layer address (e.g., network interface) associated with the destination network device 110, the hybrid ARP unit 104 may receive an ARP response message indicating the association between the network layer address and the link layer address. If the destination network device 110 is a hybrid device, the hybrid ARP unit 104 may also receive one or more topology messages from the destination network device 110. The topology messages can comprise a list of all the link layer addresses associated with the destination network device 110 as will be described below. In some embodiments, if the destination network device 110 is a hybrid device, the received ARP response messages and/or the topology messages can comprise a unique identifier (e.g., a link layer address, a hybrid networking sub-layer identifier, or another suitable identifier) associated with the hybrid networking sub-layer of the destination network device 110.

In some embodiments, if the hybrid ARP unit 104 receives topology messages from the destination network device 110, this can indicate that the destination network device 110 is a hybrid networking capable device (e.g., an IEEE 1905.1 capable device). The topology messages can include link layer topology discovery (LLTD) messages, link layer discovery protocol (LLDP) messages, IEEE 1905.1 topology messages, or other suitable messages. In some embodiments, the topology message can indicate the network layer address of the destination network device 110 and all its associated link layer addresses. In this embodiment, the topology message may be sufficient for the hybrid ARP unit 104 to populate the address association information for the destination network device 110 in the hybrid ARP cache 106. In another embodiment, the topology message can indicate a hybrid networking sub-layer identifier of the destination network device 110 and all the associated link layer addresses. In this embodiment, the topology message may not include the network layer address of the destination network device 110. In this embodiment, the hybrid ARP cache 106 may comprise (based on previously received messages/frames) a network layer address to link layer address association for one of the link layer addresses identified the topology message, or may comprise an association between the network layer address and the hybrid networking sub-layer identifier. Accordingly, the topology message can be used to completely populate the network layer to link layer associations for a hybrid networking sub-layer identifier and to ensure that the hybrid ARP cache 106 does not comprise old/invalid associations for the destination network device 110. As will be further discussed below at block 410, the hybrid ARP unit 104 can use a combination of ARP response messages and topology messages to populate/manage content of the hybrid ARP cache 106. The flow continues at block 410.

At block 410, the hybrid ARP cache is updated based on the received one or more ARP response messages and/or topology messages. For example, the hybrid ARP unit 104 can update the hybrid ARP cache 106 based, at least in part, on the one or more ARP response messages and/or topology messages received from the destination network device 110 at block 408. The hybrid ARP cache 106 can comprise a network layer address associated with the destination network device 110, one or more link layer addresses associated with corresponding one or more network interfaces of the destination network device 110, a preferred transmission route associated with each of the link layer addresses, a previously used transmission route associated with each of the link layer addresses, route metric information associated with each transmission route between the hybrid device 102 and the destination network device 110, etc. Various mechanisms can be employed to implement the hybrid ARP cache 106. In one embodiment, if the destination network device is a hybrid device 110, the hybrid ARP cache 106 can comprise multiple entries for the hybrid device 110. Each of the multiple entries associated with the hybrid device 110 can have a common network layer address but can have a different link layer address. In other words, for the hybrid device 110, the hybrid ARP cache 106 can comprise one entry for each association between the network layer address and the link layer address. Thus, if the hybrid device 110 comprises five network interfaces (and corresponding five link layer addresses), the hybrid ARP cache 106 can comprise five entries for the hybrid device 110. Each entry in the hybrid ARP cache 106 can indicate the association between the network layer address (common across all the link layer addresses) and one of the five link layer addresses. Additionally, each cache entry can also indicate a preferred transmission route (also referred to as a delivery route) associated with the link layer address. In some embodiments, the hybrid ARP cache 106 can be organized (or can comprise links between entries associated with the same hybrid device 110) to enable the hybrid ARP unit 104 to quickly locate all the entries associated with a hybrid device 110 (based on knowledge of one of the link layer addresses, the network layer address, the hybrid networking sub-layer identifier, etc.).

In another embodiment, the hybrid ARP cache 106 can be organized to include a primary ARP database and a secondary ARP database. For each network device, the primary ARP database can comprise a single entry indicating an association between the network layer address and a single link layer address (irrespective of whether the network device is a legacy device or a hybrid device). In some embodiments, if the network device is a hybrid device, the primary ARP database can comprise a single entry indicating an association between the network layer address and a hybrid networking sub-layer identifier. The secondary ARP database can comprise a list of all the link layer addresses associated with the network device. The secondary ARP database and/or the primary ARP database can also comprise appropriate links between the primary ARP database and the secondary ARP database to enable the hybrid ARP unit 104 to easily locate related entries. In some embodiments, for each entry in the primary ARP database that is associated with a legacy device, the secondary ARP database can comprise a single entry that identifies the single associated link layer address. Alternatively, in other embodiments, if primary ARP database indicates that the network device is a legacy device, then the secondary ARP database may not comprise any entries for the network device. In this embodiment, the secondary ARP database may only comprise a list of link layer addresses for those network devices that are designated as hybrid devices.

In some embodiments, each of the entries in the hybrid ARP cache 106 can also be associated with transmission route information, network topology information, and/or route metric information. The hybrid ARP unit 104 can use the transmission route information, the network topology information, and/or the route metric information for selecting the appropriate destination link layer address that should be populated in the frame scheduled to be transmitted. In some embodiments, the transmission route information, the network topology information, and/or the route metric information can be integrated into the hybrid ARP cache 106. In another embodiment, where the hybrid ARP cache 106 is organized into primary and secondary ARP databases, the transmission route information, the network topology information, and/or the route metric information can be integrated into the secondary ARP database. In another embodiment, the transmission route information, the network topology information, and/or the route metric information can be stored in one or more separate routing databases. The hybrid ARP cache 106 (or the secondary ARP database) can comprise pointer that link entries in the hybrid ARP cache 106 (or the secondary ARP database) to the corresponding transmission route information, network topology information, and/or route metric information in the routing databases.

In some embodiments, each entry in the hybrid ARP cache 106 can also be associated with selection history information that indicates when the hybrid ARP unit 104 last used the entry to populate a destination link layer address field in a frame, a type/class of the frame, a transmission route that was used to transmit the frame, etc. This selection history information can be used to maintain consistency in the selection of the destination link layer address and the transmission route for a particular class of frames, or a set of frames with common characteristics. The selection history information can be stored A) as part of the hybrid ARP cache 106, B) as part of the secondary (or primary) ARP database, or C) in a separate database. After the hybrid ARP cache 106 is updated, the flow continues at block 412.

At block 412, a transmission route and a transmit interface are determined based, at least in part, on the hybrid ARP cache. For example, the hybrid ARP unit 104 can access the hybrid ARP cache 106 and identify one or more entries in the hybrid ARP cache 106 associated with the destination hybrid device 110. In some embodiments, a unique identifier associated with the hybrid networking sub-layer (e.g., an IEEE 1905.1 abstraction sub-layer) of the destination network device 110 can be used to identify entries in the hybrid ARP cache 106 that correspond to the destination hybrid device 110. Based on the one or more entries identified in the hybrid ARP cache 106, the hybrid ARP unit 104 can select a transmission route for the frame and a transmit interface (of the source hybrid device 102) from which the frame should be transmitted to the destination hybrid device 110. The hybrid ARP unit 104 can also determine (e.g., using the hybrid ARP cache 106) a source link layer address associated with the selected transmit interface and the transmission route. In some embodiments, the selection of which entry of the hybrid ARP cache 106 should be used (e.g., which network interface should be used to transmit the frame) can be based on a preferred transmission route determined using network topology information, route metric information, the selection history information, etc. For example, the hybrid ARP unit 104 can first select the transmission route (e.g., based on analyzing communication medium performance values) and can then select the transmit interface based on the selected transmission route. In another embodiment, the hybrid ARP unit 104 can first select the transmit interface (e.g., based on network interfaces supported by the destination network device, communication network performance values, etc.) and can then select a transmission route that originates from the selected transmit interface. The flow continues at block 414.

At block 414, a destination link layer address is determined based, at least in part, on the hybrid ARP cache. For example, the hybrid ARP unit 104 can access the hybrid ARP cache 106 and identify the destination link layer address associated with the destination network device 110. In some embodiments, the hybrid ARP unit 104 can determine a receive interface of the destination network device 110 based on the transmission route selected at block 412. In this embodiment, the destination link layer address (e.g., a medium access control (MAC) address) can be a link layer address that corresponds to the receive interface of the destination network device 110. In another embodiment, an identifier associated with the hybrid networking sub-layer of the destination hybrid device can be selected as the destination link layer address. In another embodiment, a link layer address associated with any of the plurality of network interfaces of the destination hybrid device (not necessarily one associated with the receive interface) can be selected as the destination link layer address. The flow continues at block 416.

At block 416, the frame including the destination link layer address is transmitted to the destination hybrid device from the transmit interface and via the transmission route. For example, the hybrid ARP unit 104 can populate the source link layer address and the destination link layer address in a source link layer address field and a destination link layer address field of the frame. The hybrid ARP unit 104 can then provide the frame to the transceiver unit 108 for transmission to the destination hybrid device 110. The transceiver unit 108 can transmit the frame from the transmit interface to the destination hybrid device 110 via the selected transmission route. From block 416, the flow ends.

It should be noted that although FIG. 4 depicts the hybrid device 102 transmitting an ARP request message to the destination network device 110 if the hybrid ARP cache 106 does not comprise one or more entries for the destination network device 110, embodiments are not so limited. In another embodiment, the hybrid device 102 may transmit the ARP request message irrespective of whether a frame is scheduled to be transmitted to the destination network device 110. For example, the hybrid device 102 can transmit the ARP request message to one or more network devices in the communication network 100 at periodic/predetermined time intervals. In another embodiment, in response to determining that a frame is scheduled to be transmitted to the destination network device 110, the hybrid device 102 may not determine whether the hybrid ARP cache 106 comprises one or more entries associated with the destination hybrid device 110. Instead, the hybrid device 102 can automatically transmit the ARP request message to the destination hybrid device 110 in response to determining to transmit a frame to the destination hybrid device 110.

In some embodiments, the hybrid ARP unit 104 may maintain entries in the hybrid ARP cache 106 for those network layer addresses (e.g., for those legacy devices or hybrid devices) with which the hybrid device 102 is actively communicating. If the hybrid ARP unit 104 receives an ARP announcement message (and/or topology messages) from another network device (e.g., the hybrid device 110) in the communication network 100, the hybrid ARP unit 104 can update the hybrid ARP cache 106 based on information in the ARP announcement message (and/or topology messages) if one or more corresponding entries (associated with the hybrid device 110) already exist in the hybrid ARP cache 106 or if there is a queued frame scheduled to be transmitted to the hybrid device 110. Otherwise, the hybrid ARP unit 104 can discard the received ARP announcement messages (and/or topology messages). In other embodiments, the hybrid ARP unit 104 can maintain entries in the hybrid ARP cache 106 for all the network devices in the communication network 100 irrespective of whether the hybrid device 102 is actively communicating with the network devices.

Figure 5:
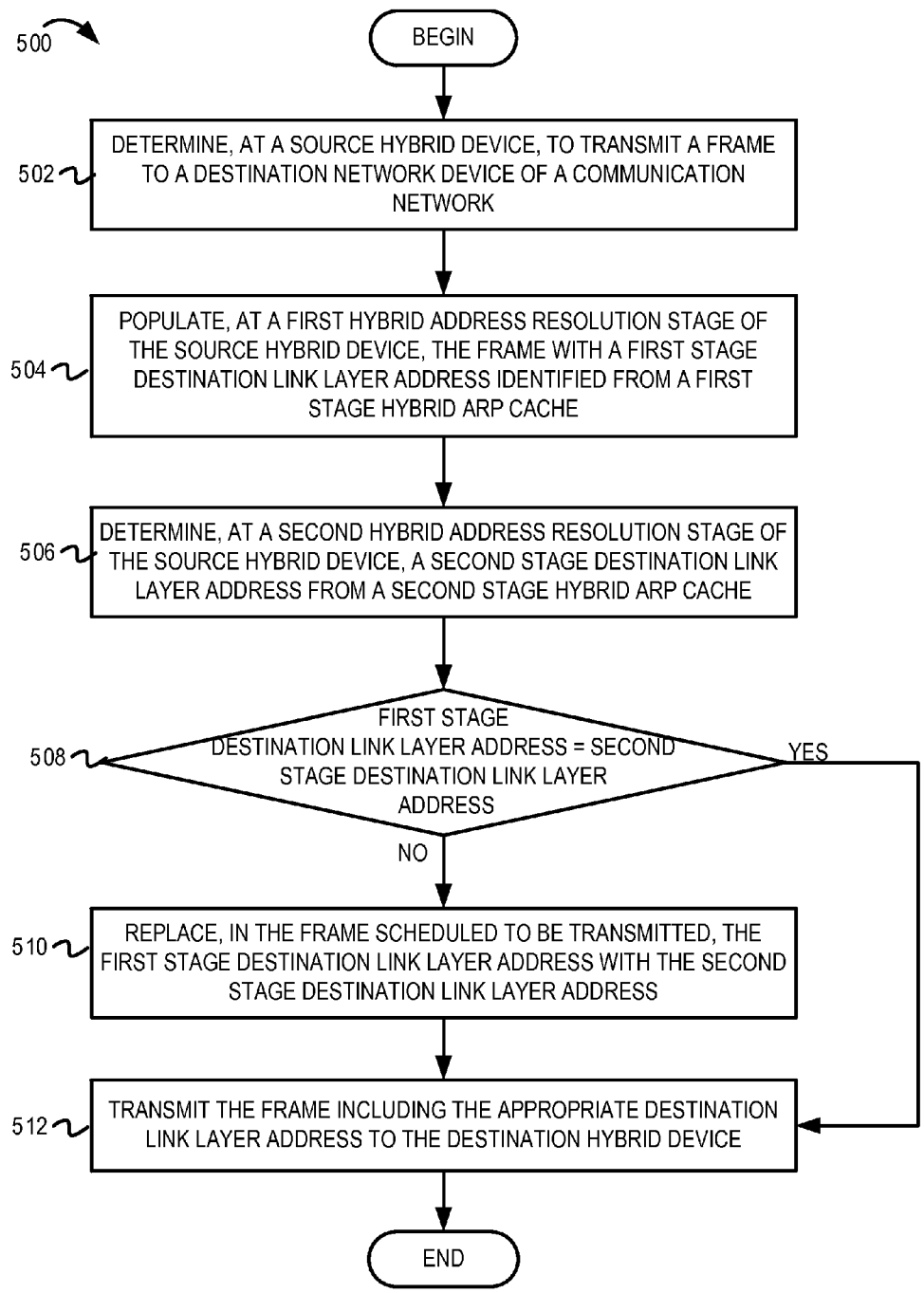
FIG. 5 is a flow diagram illustrating example operations of a two-stage hybrid address resolution process.

FIG. 5 is a flow diagram 500 illustrating example operations of a two-stage hybrid address resolution process. The flow 500 begins at block 502.

At block 502, a source hybrid device determines to transmit a frame to a destination network device of a communication network. With reference to the example of FIG. 1, the hybrid ARP unit 104 of the source hybrid device 102 can determine that a frame is scheduled to be transmitted to the destination network device 110. As will be further described below in FIG. 5, the hybrid ARP unit 104 can implement a two-stage hybrid address resolution process to select and populate an appropriate destination link layer address associated with the destination network device 110 in the frame scheduled to be transmitted. It is noted that the destination network device can be a legacy device or a hybrid device. The flow continues at block 504.

At block 504, a first hybrid address resolution stage of the source hybrid device populates the frame with a destination link layer address identified from a first stage hybrid ARP cache ("first stage destination link layer address"). In the two-stage hybrid address resolution process described in FIG. 5, a first stage hybrid ARP cache associated with the first hybrid address resolution stage can comprise a single entry for each network device in the communication network 100 (irrespective of whether the network device is a legacy device or a hybrid device). In other words, the first stage hybrid ARP cache can comprise a single entry for each unique network layer address. For each entry in the first stage hybrid ARP cache, the link layer address associated with the network layer address can be any link layer address of the network device. In some embodiments, the first stage destination link layer address determined from the first stage hybrid ARP cache can be the link layer address associated with the preferred transmission route of the destination network device. In another embodiment, the first stage destination link layer address can be a hybrid networking sub-layer identifier if the destination network device is a hybrid device. In another embodiment, if the destination network device is a hybrid device, the first stage destination link layer address can be any arbitrarily selected link layer address of the hybrid device. To resolve the network layer address in the frame scheduled to be transmitted, the first hybrid address resolution stage can determine (from the frame scheduled to be transmitted) the network layer address of the destination network device. The first hybrid address resolution stage can then identify an entry in the first stage hybrid ARP cache that comprises the network layer address of the destination network device and can identify a corresponding first stage destination link layer address. The identified first stage destination link layer address can be populated in the destination link layer address field of the frame. If the first stage hybrid ARP cache does not comprise an entry (or a link layer address) that corresponds to the network layer address in the frame scheduled to be transmitted, the first hybrid address resolution stage can transmit an ARP request to the destination network device and can accordingly populate the first stage hybrid ARP cache, as described above with reference to blocks 404-410 of FIG. 4. The first hybrid address resolution stage can provide the frame including the first stage destination link layer address to a second hybrid address resolution stage. The flow continues at block 506.

At block 506, the second hybrid address resolution stage of the source hybrid device determines a destination link layer address identified from a second stage hybrid ARP cache ("second stage destination link layer address"). In the two-stage hybrid address resolution process described in FIG. 5, the second stage hybrid ARP cache can comprise a list of all the link layer addresses associated with each network device of the communication network 100. In some embodiments, if the destination network device is a legacy device, the second stage hybrid ARP cache can comprise a single link layer address associated with the legacy device. In other embodiments, if the destination network device is a legacy device, the second stage hybrid ARP cache may not comprise any entries associated with the legacy device. In some embodiments, if the destination network device is a hybrid device, the second stage hybrid ARP cache can comprise all the link layer addresses associated with the hybrid device. The second stage hybrid ARP cache may or may not comprise a hybrid networking sub-layer identifier associated with the hybrid device. The second stage hybrid ARP cache can also comprise transmission route information, network topology information, route metric information, and/or selection history information for each of the entries in the second stage hybrid ARP cache. In some embodiments, the second stage hybrid ARP cache may be distinct from the first stage hybrid ARP cache. As described above, the selection history information can comprise historical information of which transmissions routes were previously used to transmit messages to a particular destination link layer address. The transmission routes that were previously used to transmit to the destination link layer address may be re-used depending on the characteristics/type of the messages scheduled to be transmitted. In some embodiments, the list of link layer addresses, transmission route information, network topology information, route metric information, and/or selection history information can be stored in a single database. In other embodiments, the list of link layer addresses, transmission route information, network topology information, route metric information, and/or selection history information can be stored across multiple databases.

The second hybrid address resolution stage can use the first stage destination link layer address as a pointer to identify a subset of entries in the second stage hybrid ARP cache and to accordingly identify all the link layer addresses associated with the destination network device. Additionally, the second hybrid address resolution stage can also determine (from the second hybrid ARP cache) the hybrid networking sub-layer identifier, the transmission route information, the network topology information, the route metric information, and/or the selection history information associated with the destination network device. In some embodiments, the second hybrid address resolution stage can first select a transmission route based, at least in part, on analyzing the network topology information, route metric information, and/or selection history information associated with each of the identified entries. The second hybrid address resolution stage can then select the second stage destination link layer address based on the selected transmission route. In other embodiments, the second hybrid address resolution stage can first select the second stage destination link layer address and then select the transmission route based on the selected second stage destination link layer address. The flow continues at block 508.

At block 508, it is determined whether the first stage destination link layer address matches the second stage destination link layer address. For example, the second hybrid address resolution stage can determine whether the first stage destination link layer address matches the second stage destination link layer address. If it is determined that the first stage destination link layer address does not match the second stage destination link layer address, the flow continues at block 510. Otherwise, the flow continues at block 512.

At block 510, the first stage destination link layer address is replaced by the second stage destination link layer address in the frame scheduled to be transmitted. The flow 500 moves from block 508 to block 510 if it is determined that the first stage destination link layer address does not match the second stage destination link layer address. In some embodiments, the second hybrid address resolution stage can overwrite the first stage destination link layer address in the destination link layer address field of the frame scheduled to be transmitted with the second stage destination link layer address. The flow continues at block 512.

At block 512, the frame including the appropriate destination link layer address is transmitted to the destination hybrid device via the transmission route. From block 512, the flow ends.

It should be noted that although FIG. 5 describes the first hybrid address resolution stage populating the first stage destination link layer address in the frame and the second hybrid address resolution stage overwriting the first stage destination link layer address with the second stage destination link layer address (if needed), embodiments are not so limited. In some embodiments, the first hybrid address resolution stage may determine the first stage destination link layer address but may not write this value in the destination link layer address field of the frame. Instead, the first hybrid address resolution stage may provide the first stage destination link layer address to the second hybrid address resolution stage (e.g., in a message, an entry number in the first stage hybrid ARP cache, etc.). As described above, the second hybrid address resolution stage can use the first stage destination link layer address to select the second stage destination link layer address. The second hybrid address resolution stage can then write the second stage destination link layer address in the destination link layer address field of the frame.

Figure 6:
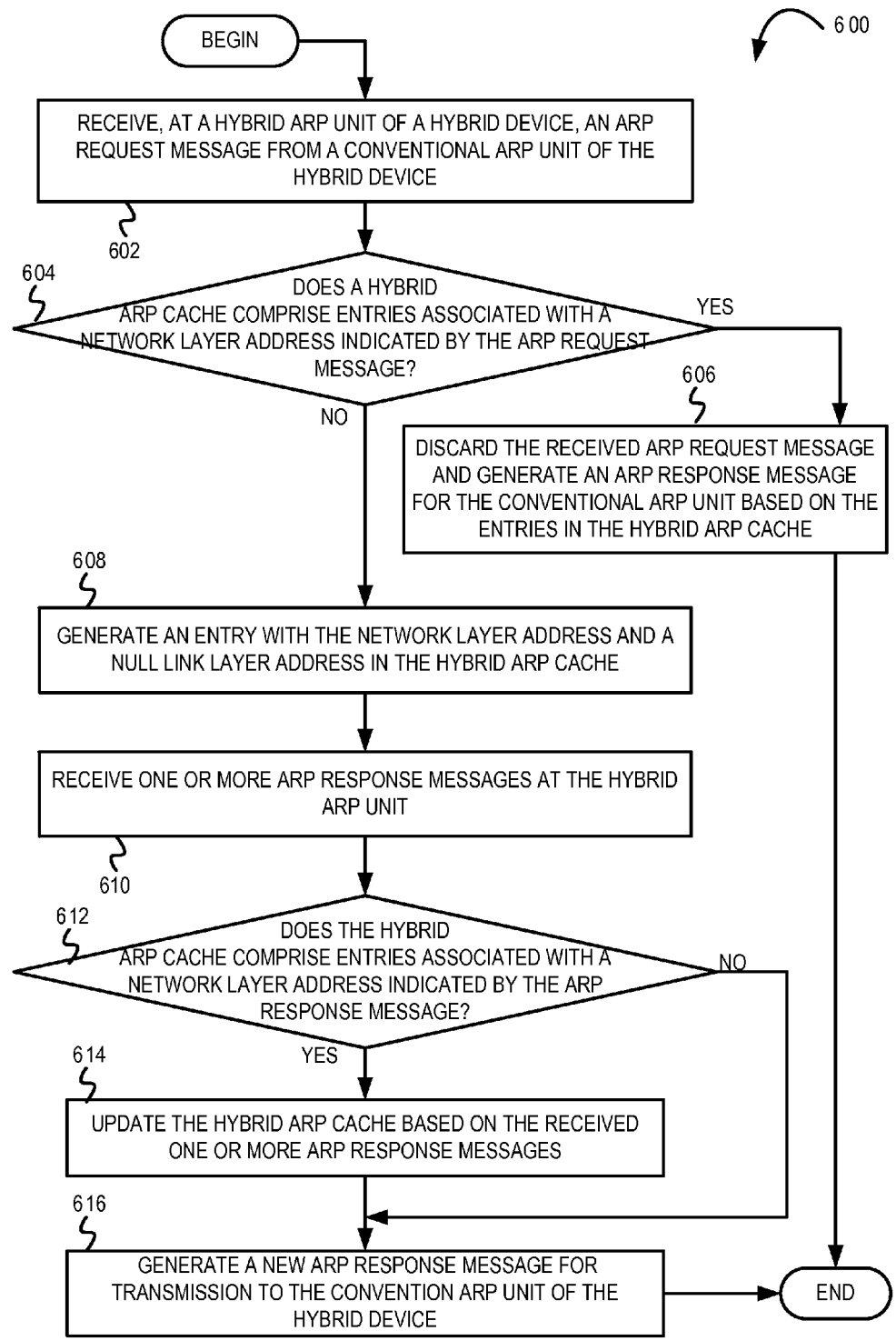
FIG. 6 is a flow diagram illustrating example operations for hybrid ARP functionality operating in conjunction with conventional ARP functionality.

FIG. 6 is a flow diagram 600 illustrating example operations for hybrid ARP functionality operating in conjunction with conventional ARP functionality. The flow 600 begins at block 602.

At block 602, a hybrid ARP unit of a hybrid device receives an ARP request message from a conventional ARP unit of the hybrid device. With reference to the example of FIG. 3, the hybrid ARP unit 104 of the hybrid device 102 may receive an ARP request message from the conventional ARP unit 302 of the hybrid device 102. The ARP request message may comprise a network layer address of a destination network device 110. In some embodiments, the hybrid device 102 may generate (or receive) a frame for transmission to the destination network device 110. The conventional ARP unit 302 may determine that the conventional ARP cache 304 associated with the conventional ARP unit 302 does not comprise a link layer address associated with the network layer address of the destination network device 110. Accordingly, the conventional ARP unit 302 can generate the ARP request message including the network layer address of the destination network device 110. The flow continues at block 604.

At block 604, it is determined whether a hybrid ARP cache comprises one or more entries associated with the network layer address indicated by the ARP request message. In response to receiving the ARP request message from upper protocol layers (i.e., the conventional ARP unit 302) of the hybrid device 102, the hybrid ARP unit 104 can determine whether the hybrid ARP cache 106 comprises one or more entries associated with the network layer address indicated in the received ARP request message. If it is determined that the hybrid ARP cache 106 comprises one or more entries associated with the network layer address, the flow continues at block 606. Otherwise, if it is determined that the hybrid ARP cache 106 does not comprise any entries associated with the network layer address, the flow continues at block 608.

At block 606, the ARP request message is discarded and an ARP response message is generated for the conventional ARP unit based on information in the hybrid ARP cache. The hybrid ARP unit 104 can discard (without transmitting) the ARP request message received from the conventional ARP unit 302 (e.g., the upper protocol layers), if it is determined that the hybrid ARP cache 106 comprises one or more entries associated with the network layer address indicated by the ARP request message. The hybrid ARP unit 104 can generate an ARP response message for the conventional ARP unit 302 (e.g., upper protocol layers) based on the identified entries (in the hybrid ARP cache) associated with the network layer address. For example, if the network layer address indicated by the ARP request message corresponds to a legacy device, the hybrid ARP unit 104 can identify a corresponding link layer address from the hybrid ARP cache 106 and provide the ARP response message including the identified link layer address to the conventional ARP unit 302. As another example, if the network layer address indicated by the ARP request message corresponds to a hybrid device, the hybrid ARP unit 104 can select and provide a predetermined one of the multiple link layer addresses associated with the hybrid device to the conventional ARP unit 302. As another example, if the network layer address indicated by the ARP request message corresponds to a hybrid device, the hybrid ARP unit 104 can select and provide a link layer address associated with a the hybrid device that corresponds to a preferred transmission route between the hybrid devices. As another example, if the network layer address indicated by the ARP request message corresponds to a hybrid device, the hybrid ARP unit 104 can provide the hybrid networking sub-layer identifier (instead of a link layer address) associated with the hybrid device to the conventional ARP unit 302 in the ARP response message. From block 606, the flow ends.

At block 608, an entry with the network layer address and a null link layer address is generated in the hybrid ARP cache. For example, the hybrid ARP unit 104 can generate a new entry in the hybrid ARP cache 106, if it is determined that the hybrid ARP cache 106 does not comprise any entries associated with the network layer address indicated by the ARP request message received from the conventional ARP unit 302. The new entry in the hybrid ARP cache 106 can comprise the network layer address indicated in the ARP request message and can comprise a "null" value (or another predetermined value) instead of the link layer address. In some embodiments, the hybrid ARP unit 104 can generate a new ARP request message for transmission to the destination network device 110 associated with the network layer address. The hybrid ARP unit 104 can discard (without transmitting) the ARP request message received from the upper protocol layers (i.e., the conventional ARP unit 302). In another embodiment, the hybrid ARP unit 104 can transmit the ARP request message received from the upper protocol layers (i.e., the conventional ARP unit 302) to the destination network device 110. The flow continues at block 610.

At block 610, one or more ARP response messages are received at the hybrid ARP unit. For example, the hybrid ARP unit 104 may receive one or more ARP response messages from the hybrid device 110. In some embodiments, the hybrid device 110 (e.g., the hybrid ARP unit 112 in conjunction with the transceiver unit 116) may transmit an ARP response message via each of its network interfaces. Each of the received ARP response messages may indicate an association between the network layer address and a different link layer address of the hybrid device 110. In some embodiments, the hybrid ARP unit 104 may receive one or more ARP response messages in response to a previously transmitted ARP request message (as described in FIG. 4). In other embodiments, the hybrid ARP unit 104 may receive one or more "unsolicited" ARP response messages (e.g., ARP announcement messages) that indicate changes in the link layer addresses, network interfaces, hybrid networking sub-layer identifier, and/or network layer address associated with the hybrid device 110. It is noted that in some embodiments, the ARP unit 104 may also receive an ARP response message (e.g., either unsolicited or in response to an ARP request message) from legacy devices of the communication network 100. The flow continues at block 612.

At block 612, in response to receiving the ARP response message, it is determined whether the hybrid ARP cache comprises one or more entries associated with a network layer address indicated in the received ARP response message ("received network layer address"). For example, the hybrid ARP unit 104 can determine whether the hybrid ARP cache 106 comprises one or more entries associated with the received network layer address. As part of determining whether the hybrid ARP cache 106 comprises one or more entries associated with the received network layer address, the hybrid ARP unit 104 can also determine whether the hybrid ARP cache 106 comprises one or more entries with a "null" (or another predetermined) value in the link layer address field associated with the received network layer address. If it is determined that the hybrid ARP cache 106 comprises one or more entries associated with a network layer address indicated in the received ARP response message, the flow continues at block 614. Otherwise, the flow continues at block 616.

At block 614, the hybrid ARP cache is updated based on the one or more received ARP response messages. For example, the hybrid ARP unit 104 can update the hybrid ARP cache 106 based on the received ARP response messages if it is determined that the hybrid ARP cache 106 comprises one or more entries associated with a network layer address indicated in the received ARP response messages. For example, if the hybrid ARP cache 106 comprises a "null" link layer address entry associated with the network layer address received in the ARP response message, the hybrid ARP unit 104 can overwrite/replace this "null" value with the link layer address (or hybrid networking sub-layer identifier) indicated in the received ARP response message. As another example, the received ARP response message can comprise one or more new link layer addresses, one or more inactive link layer addresses, an alternate hybrid networking sub-layer address, etc. The hybrid ARP unit 104 can accordingly update the hybrid ARP cache 106 to reflect this information received in the ARP response message. The flow continues at block 616.

At block 616, a new ARP response message is generated for transmission to the conventional ARP unit of the hybrid device. For example, the hybrid ARP unit 104 can generate a new ARP response message to be transmitted to the conventional ARP unit 302 (i.e., the upper protocol layers) of the hybrid device 102. In some embodiments, if the network device that generated the ARP response message received at block 610 was a hybrid device 110, the new ARP response message (generated by the hybrid ARP unit 104) can comprise the network layer address of the hybrid device 110 and a hybrid networking sub-layer identifier associated with the hybrid device 110. If the hybrid networking sub-layer identifier is unknown when the new ARP response message is generated, the hybrid ARP unit 104 can insert any suitable link layer address associated with the hybrid device 110 (or another suitable address) with a special encoding in the new ARP response message. The link layer address with the special encoding can appear as the actual link layer address to the conventional ARP unit 302. However, the hybrid ARP unit 104 can interpret link layer address with the special encoding as an indication that the hybrid networking sub-layer identifier associated with the hybrid device 110 is unknown. In some embodiments, the new ARP response message (provided from the hybrid ARP unit 104 to the conventional ARP unit 302) can include the link layer address that is associated with a primary/preferred transmission route to the hybrid device 110 associated with the link layer address. This can minimize the need to overwrite addresses in frames (scheduled to be transmitted) that are received at the hybrid ARP unit 104 from the conventional ARP unit 302 of the upper protocol layers. This can also minimize the need to generate and provide new ARP response messages to the conventional ARP unit 302 each time an ARP response message is received from another hybrid device 110 (and the hybrid ARP cache 106 is updated). In some embodiments, the hybrid ARP unit 104 may not generate the new ARP response message. Instead, the hybrid ARP unit 104 can simply modify the received ARP response message (received at block 610) so that the modified ARP response message includes the hybrid networking sub-layer identifier (or another suitable link layer address). The value provided to the conventional ARP unit 302 in the link layer address field of the new/modified ARP response message can be used (by the hybrid ARP unit 104) as a link/pointer to the hybrid ARP cache 106. From block 616, the flow ends.

It should be understood that in response to determining to transmit a frame to a destination network device (either a legacy device or a hybrid device), the conventional ARP unit 302 can populate the destination link layer address in the frame based on information in the conventional ARP cache 304. The hybrid ARP unit 104 can receive this frame including the destination link layer address populated by the conventional ARP unit 302. This destination link layer address (populated by the conventional ARP unit 302) may be the hybrid networking sub-layer identifier associated with the destination network device, another suitable address/identifier, or a special encoding that indicates that the link layer address (or hybrid networking sub-layer identifier) associated with the destination network device is unknown. As described above with reference to FIGS. 4 and 5, the hybrid ARP unit 104 can use the destination link layer address (populated by the conventional ARP unit 302) as a pointer to the hybrid ARP cache 106, select a transmission route, a transmit interface, and/or a target destination link layer address based on information in the hybrid ARP cache 106. The hybrid ARP unit 104 can overwrite one or more fields in the frame (if necessary) to reflect the information determined from the hybrid ARP cache 106. The frame can then be transmitted from the selected transmit interface and via the selected transmission route.

It is also noted that in some embodiments, the hybrid ARP cache 106 may not comprise entries for the network layer address indicated by the ARP request message received from the conventional ARP unit 302 at block 602. In this embodiment, the hybrid ARP unit can generate (and transmit to the conventional ARP unit 302) an ARP response message that includes a substitute link layer address. This substitute link layer address can be a special encoding for the link layer address and can appear (to the conventional ARP unit 302) to be the actual link layer address associated with the network layer address indicated by the ARP request message. However, the presence of the special encoding can indicate to the hybrid ARP unit 104 that a hybrid networking sub-layer identifier (or a link layer address) associated with the network layer address is unknown. In response to receiving this ARP response message from the hybrid ARP unit 104, the conventional ARP unit 302 can update the traditional ARP cache 304, populate the substitute link layer address in the link layer address field of the frame directed to the destination network device, and provide the frame to the hybrid networking sub-layer (e.g., the hybrid ARP unit 104) for transmission. Additionally, after the hybrid ARP unit 104 provides the ARP response message comprising the substitute link layer address (e.g., the special encoding) to the conventional ARP unit 302, the hybrid ARP unit 104 can generate and transmit one or more ARP request messages to the destination network device, receive one or more ARP response messages (and/or topology messages), and populate the hybrid ARP cache 106 based on the received messages as described above. The hybrid ARP unit 104 may or may not transmit new ARP response messages to the conventional ARP unit to reflect the address information received from the destination network device 110. It should also be noted that in some embodiments, the hybrid ARP unit 104 may receive (from the conventional ARP unit 302) an ARP request message that includes a network layer address that is not part of the hybrid ARP cache 106. In this embodiment, the hybrid ARP unit 104 can create an entry in the hybrid ARP cache 106 that comprises the network layer address and a "null" value for the link layer address. After the hybrid ARP unit 104 receives the appropriate ARP response messages (and/or topology messages) from the destination network device 110, the hybrid ARP unit 104 can update the hybrid ARP cache 106 by replacing the "null" value with the correct link layer address associated with the destination network device 110.

In some embodiments, if the hybrid ARP unit 104 receives an ARP request message from another hybrid device 110 (e.g., the hybrid ARP unit 112), the hybrid ARP unit 104 may transmit one or more ARP response message and/or topology messages to the hybrid device 110. The hybrid ARP unit 104 may not transmit the received ARP request message to the conventional ARP unit 302 associated with the upper protocol layers. Alternately, the hybrid ARP unit 104 may forward the received ARP request message to the conventional ARP unit 302, modify the ARP response message generated by the conventional ARP unit 302 (if needed), and provide the modified ARP response message to the hybrid device 110. Furthermore, if the hybrid ARP unit 104 determines (e.g., based on received ARP response messages and/or received topology messages) that a link layer address (or hybrid networking sub-layer identifier) associated with a hybrid device 110 has been updated, the hybrid ARP unit 104 can transmit a gratuitous/unsolicited ARP announcement message to the conventional ARP unit 302 to cause the conventional ARP unit 302 to change address associations in the conventional ARP cache 304.

It should be understood that FIGS. 1-6 are examples meant to aid in understanding embodiments and should not be used to limit embodiments or limit scope of the claims. Embodiments may perform additional operations, fewer operations, operations in a different order, operations in parallel, and some operations differently. In some embodiments, the hybrid ARP cache 106 may comprise a limited number of entries. Therefore, suitable mechanisms may be employed to remove one or more entries from the hybrid ARP cache 106 to make space for new entries and new address mappings. In one embodiment, an aging process can be used to identify which entries should be deleted from the hybrid ARP cache 106. For example, the hybrid ARP unit 104 may determine not to delete an entry in the hybrid ARP cache 106 (e.g., by setting a flag bit associated with the entry) in response to receiving an ARP response message that confirms the validity of that entry. As another example, the hybrid ARP unit 104 may determine not to delete an entry in the hybrid ARP cache 106 in response to receiving a topology message that confirms the validity of that entry. As another example, one or more entries in the hybrid ARP cache 106 can be aged out (e.g., removed from the hybrid ARP cache 106) if they have not recently been used to populate destination link layer addresses in transmitted frames. In this example, each of the entries in the hybrid ARP cache 106 can be associated with a timestamp that can be updated each time the entry is used. An entry can be discarded if the timestamp associated with the entry expires or is greater than a predetermined aging threshold time. Additionally, if one of the entries associated with a hybrid device 110 has aged, all of the entries associated with that hybrid device 110 can be removed from the hybrid ARP cache 106 to avoid partial information about the hybrid device 110. This can minimize the possibility of making a poor choice of a destination link layer address due to incomplete information about the network interfaces associated with the hybrid device 110. In another embodiment, the hybrid ARP unit 104 can periodically transmit ARP request messages to each network layer address in the hybrid ARP cache 106 and can update the entries in the hybrid ARP cache 106 based on the received ARP response messages to ensure that the information in the hybrid ARP cache 106 is current. In another embodiment, the hybrid ARP unit 104 can snoop/examine the source network layer address and source link layer address fields in received frames to determine whether the corresponding entries in the hybrid ARP cache 106 are valid. If the entries in the hybrid ARP cache 106 are inconsistent with the source network layer address and source link layer address fields determined from the received frames, the entries can be deleted from the hybrid ARP cache 106.

In some embodiments, the hybrid ARP unit 104 can use topology messages to determine which entries should be removed from the hybrid ARP cache 106. For example, if a received topology message comprises a network layer address and a list of all associated link layer addresses (and/or an identifier associated with the hybrid networking sub-layer), then the hybrid ARP unit 104 can update the hybrid ARP cache 106 to be consistent with the information in the received topology message. The entries in the hybrid ARP cache 106 that are not consistent with received topology messages can be removed from the hybrid ARP cache 106. In some embodiments, a received topology message may comprise a list of all the link layer addresses associated with a hybrid device 110, but may not comprise a network layer address associated with the hybrid device 110. In this embodiment, the hybrid ARP unit 104 can determine whether there is at least one entry in the hybrid ARP cache 106 with a link layer address that matches a link layer address in the received topology message. If so, the hybrid ARP unit 104 can update the hybrid ARP cache 106 using the information in the received topology message and the knowledge of the network layer address determined from the hybrid ARP cache 106.

In some embodiments, when the hybrid device 102 first joins the communication network, the hybrid ARP unit 104 may receive topology messages associated with one or more hybrid devices (or device interfaces) in the communication network 100 prior to receiving ARP response messages. In another embodiment, the hybrid ARP unit 104 may receive the ARP response messages prior to receiving the topology messages. Regardless of the order in which the messages are received, the hybrid ARP unit 104 can populate/prune the hybrid ARP cache 106 using the information determined from all the received messages. Information that was not received in the messages can be temporarily marked in the hybrid ARP cache 106 as "unknown." For example, if a topology message (received at the hybrid ARP unit 104) does not comprise a network layer address associated with the hybrid device 110 that transmitted the topology message, the hybrid ARP unit 104 can create one or more entries in the hybrid ARP cache 106 based on other information (e.g., the one or more link layer addresses) received in the topology message and can mark the network layer address field as "unknown." When the hybrid ARP unit 104 receives an ARP response message (or another topology message) with the missing information, the hybrid ARP unit 104 can locate one or more matching entries in the hybrid ARP cache 106 and can populate those entries with the appropriate network layer addresses received in the ARP response message.

In some embodiments, a hybrid device 110 (e.g., the hybrid ARP unit 112) can transmit an ARP "cancel association" message to indicate that one of the link layer addresses (associated with an underlying network interface) of the hybrid device 110 is not valid. For example, the ARP "cancel association" message can be transmitted if a network interface associated with the hybrid device 110 is disabled, or if a network layer address associated with the hybrid device 110 (and the hybrid networking sub-layer) has changed and is no longer valid. In response to receiving the ARP "cancel association" message, the hybrid device 102 (e.g., the hybrid ARP unit 104) can identify one or more entries in the hybrid ARP cache 106 that corresponds to the canceled link layer address and/or the canceled network layer address indicated in the ARP "cancel association" message. The hybrid ARP unit 104 can remove the identified one or more entries from the hybrid ARP cache 106. Various techniques can be employed to indicate whether an ARP announcement message is an ARP "cancel association" message. In one example, a predetermined value can be transmitted in a field of the ARP announcement message to designate it as an ARP "cancel association" message. As another example, a predetermined encoding can be applied to the ARP announcement message to indicate that the ARP announcement message is an ARP "cancel association" message. As another example, an ARP "cancel association" message can be transmitted using a message format that is different from the message format of the traditional ARP announcement message. As another example, a predetermined encoding can be applied to a subset of fields of the ARP announcement message to indicate that the ARP announcement message is an ARP "cancel association" message. For example, a "group/multicast" bit or a "locally administered address" bit in the link layer address field in the ARP announcement message can be set to "1" to designate the message as an ARP "cancel association" message.

In some embodiments, the hybrid devices 102 and 110 (e.g., the hybrid ARP units 104 and 112) may not use topology messages to populate their respective hybrid ARP cache 106 and 114. Instead, the hybrid ARP units 104 and 112 can use conventional ARP procedures and conventional ARP messages to populate their respective hybrid ARP caches 106 and 114 and to indicate the network layer address to link layer address association. In this embodiment, if a hybrid ARP unit 104 receives an ARP request message from another hybrid ARP unit 112, then the hybrid ARP unit 104 can respond with multiple unique ARP response messages—one for each network interface of the hybrid device 102 (i.e., one for each link layer address associated with the hybrid device 102). The combination of the multiple ARP response messages can indicate the complete one-to-many association between a network layer address and the link layer addresses of the hybrid device 102. Other hybrid devices that receive the ARP response messages can populate their respective hybrid ARP caches as described above with reference to FIGS. 1-6. If the hybrid ARP unit 112 determines that the network layer address received in an ARP response message is already present in the hybrid ARP cache 114, but that the link layer address received in the ARP response message is not present in the hybrid ARP cache 114, the hybrid ARP unit 112 can add a new entry to the hybrid ARP cache 114 to reflect the association between the network layer address and the link layer address received in the ARP response message.

It should be understood that in addition to the operations described herein, the hybrid ARP unit 104 of the hybrid device 102 can also transmit unsolicited ARP announcement messages to notify other hybrid devices 110 if the network layer to link layer association of the hybrid device 102 changes. For example, if a previously disabled network interface of the hybrid device 102 is enabled, the hybrid ARP unit 104 can transmit an unsolicited ARP announcement message to cause the other hybrid devices 110 to update their respective hybrid ARP caches. In some embodiments, if all the network devices in the communication network 100 are hybrid devices, then the hybrid ARP unit 104 can transmit a multicast ARP announcement message to announce the new network layer address to link layer address associations. Otherwise, the hybrid ARP unit 104 can transmit a unicast message to selectively notify one or more of the network devices (e.g., to notify only the hybrid devices). In some embodiments, the hybrid ARP unit 104 can transmit a unicast ARP announcement message to a legacy device only if there is a modification in the primary transmission route associated with the hybrid device 102. It is noted that in some embodiments, the hybrid ARP unit 104 can determine whether a network device is a legacy or a hybrid device based on a type of messages received from the network device, a notification in one or more messages received from the network device, a number of messages received from the network device, etc. For example, if the hybrid ARP unit 104 receives multiple ARP announcement messages from the same network device within a predetermined time interval, the hybrid ARP unit 104 can determine that the network device is a hybrid device. As another example, if the hybrid ARP unit 104 receives topology messages from a network device, the hybrid ARP unit 104 can determine that the network device is a hybrid device.

In some embodiments, the hybrid ARP unit 104 can infer network topology and/or available transmission routes by examining received ARP announcement messages, ARP response messages, and/or topology messages. For example, a source network device may populate a source link layer address in the ARP announcement message. If the source link layer address is associated with the source network device's transmit interface, then in response to receiving the ARP announcement message at a receive interface of the hybrid device 102, the hybrid ARP unit 104 can infer that there is a valid transmission route between the receive interface of the hybrid device 102 and the transmit interface (corresponding to the source link layer address) of the source network device. Accordingly, the hybrid ARP unit 104 can store this information in a network topology database, a transmission route database, and/or the hybrid ARP cache 106. In some embodiments, the hybrid ARP unit 104 can also calculate an arrival time associated with the transmission route to infer the quality of the transmission route.

In some embodiments, the hybrid ARP unit 104 of the hybrid device 102 can employ topology messages to maintain entries (in the hybrid ARP cache 106) associated with hybrid devices. The hybrid ARP unit 104 can employ ARP messages to maintain entries (in the hybrid ARP cache 106) associated with legacy (non-hybrid) devices. For this, the topology messages may be configured to include the network layer address in addition to the link layer addresses associated with the hybrid device 110 that is transmitting the topology message. In this embodiment, to update entries (in the hybrid ARP cache 106) associated with the hybrid device 110, the hybrid ARP unit 104 of the hybrid device 102 can transmit a request (to the hybrid device 110) for topology messages instead of transmitting an ARP request message. Alternately, the hybrid ARP unit 104 can transmit a multicast message to all the hybrid devices requesting topology messages associated with corresponding ones of the hybrid devices. In some embodiments, each of the hybrid devices may transmit (in a topology message) a complete list of link layer addresses, a network layer address, and/or a hybrid networking sub-layer identifier associated with the hybrid device. Each of the hybrid devices may also transmit an ARP announcement message comprising the network layer address and the link layer address associated with a preferred transmission route. This can ensure that, A) the legacy devices of the communication network utilize the preferred transmission route for communicating with the hybrid device and B) other hybrid devices are aware of the network layer address, the hybrid networking sub-layer identifier, and all the link layer addresses of the hybrid device that transmitted the topology message.

In some embodiments, if the hybrid ARP unit 104 of the hybrid device 102 receives an ARP request message, then the hybrid ARP unit 104 can respond with an ARP announcement message that comprises the link layer address that is associated with a preferred transmission route between the hybrid device 102 and the network device that transmitted the ARP request message. In another embodiment, if the hybrid ARP unit 104 receives an ARP request message, the hybrid ARP unit 104 can first determine whether a hybrid device or a legacy device transmitted the ARP request message. If a hybrid device transmitted the ARP request message, the hybrid ARP unit 104 can respond with an ARP response message and can provide the hybrid networking sub-layer identifier in the link layer address field of the ARP response message. In other embodiments, if a hybrid device transmitted the ARP request message, the hybrid ARP unit 104 can respond by transmitting multiple ARP response messages on corresponding ones of multiple network interfaces. In other embodiments, if a hybrid device transmitted the ARP request message, the hybrid ARP unit 104 can respond by transmitting a topology message including a list of all the link layer addresses associated with the hybrid devices 102. In some embodiments, if a legacy device transmitted the ARP request message, the hybrid ARP unit 104 can respond with an ARP response message and can provide the link layer address associated with a preferred transmission route of the hybrid device 102.

In some embodiments, the hybrid ARP unit 104 may transmit (via the transceiver unit 108) ARP request messages and unsolicited ARP announcement messages from each network interface of the hybrid device 102. However, in some embodiments, the hybrid ARP unit 104 may have knowledge of the location of the destination network device within the communication network 100 (e.g., a transmit interface from which the ARP request message should be transmitted). Accordingly, the hybrid ARP unit 104 can transmit the ARP request message only via the "known" transmit interface. In some embodiments, the hybrid ARP unit 104 may determine (e.g., based on network topology and/or route metric information) that the unsolicited ARP announcement messages should be transmitted via a subset of network interfaces of the hybrid device 102. Accordingly, the hybrid ARP unit 104 can transmit the unsolicited ARP announcement messages can be transmitted via the identified subset of the network interfaces. In some embodiments, in response to receiving an ARP request message, the hybrid ARP unit 104 can transmit the ARP response message via the same network interface on which the ARP request message was received. In some embodiments, based on network topology information, the hybrid ARP unit 104 can transmit the ARP response message via one or more network interfaces that are different from the network interface at which the ARP request message was received.

Finally, it is noted that although the Figures describe the transmission route being selected based on route metric information, transmission route information, address association information, etc., embodiments are not so limited. In other embodiments, the transmission route can be selected based on the type of the frame or a class of traffic to which the frame (scheduled for transmission) belongs. The class of traffic to which the frame belongs can be determined based on a priority level associated with the frame, a type of protocol (UDP or TCP), and/or layer 3 indicators that indicate a common stream of traffic or that infer delivery urgency. For example, a first transmission route (e.g., a preferred or best available transmission route) and a corresponding first transmit interface may be selected for transmitting high priority frames between a pair of devices. A second transmission route (e.g., not necessarily the best available transmission route) and a corresponding second transmit interface may be selected for transmitting lower priority frames between the same pair of devices so that transmission of the lower priority frames do not compete with (or interfere with) transmission of the high priority frames. In some embodiments, when the transmission route for a frame is determined based on a previously selected transmission route, the previously selected transmission route may have been determined based on the type of the frame or a class of traffic to which the previously transmitted frame belongs. For example, in response to determining to transmit a frame associated with a predefined priority level, a transmission route that was previously used for transmitting frames with the same predefined priority level can be selected.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
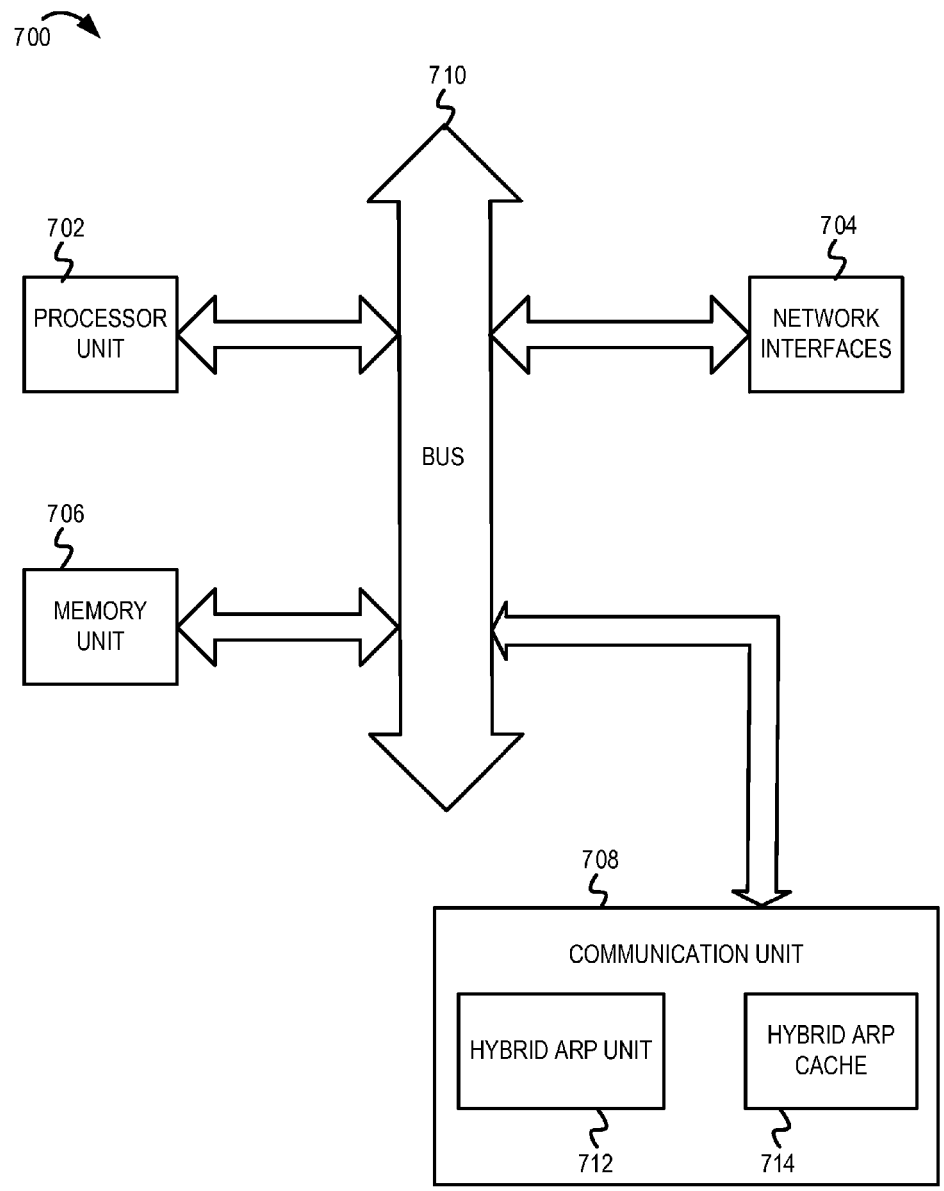
FIG. 7 is a block diagram of one embodiment of an electronic device including a hybrid ARP mechanism for hybrid communication networks.

FIG. 7 is a block diagram of one embodiment of an electronic device 700 including a hybrid ARP mechanism for hybrid communication networks. In some implementations, the electronic device 700 may be one of a desktop computer, laptop computer, a tablet computer, a mobile phone, a smart appliance, a powerline communication device, a gaming console, a network bridging device, an access point, or other electronic system comprising a hybrid communication unit configured to communicate across multiple communication networks. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, Infini-Band®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). In some implementations, the electronic device 700 can comprise a plurality of network interfaces—each of which couples the electronic device 700 to a different communication network. For example, the electronic device 700 can comprise a PLC interface, an Ethernet interface, and a WLAN interface that couple the electronic device 700 with a powerline communication network, an Ethernet, and a wireless local area network respectively.

The electronic device 700 also includes a communication unit 708. The communication unit 708 comprises a hybrid ARP unit 712 and hybrid ARP cache 714. In some embodiments, the communication unit 708 can execute hybrid ARP functionality for managing one-to-many associations between a single network layer address and multiple link layer addresses. The hybrid ARP unit 712 can employ a single-stage approach (described in FIGS. 2 and 4) or a dual-stage approach (described in FIG. 5) to populate and maintain address association information in the hybrid ARP cache 714 and to use this address association information to populate the appropriate destination link layer address in a frame scheduled to be transmitted. The hybrid ARP unit 712 (and the hybrid ARP cache 714) can operate in conjunction with the conventional ARP functionality (implemented by upper protocol layers), as described above with reference to FIGS. 3 and 6.

Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for address resolution in hybrid communication networks as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining a transmission route and a corresponding destination network interface associated with a second device, the transmission route for a first message to be transmitted from a first device to the second device via a communication network, wherein the transmission route is determined based, at least in part, on an address resolution cache, and wherein the address resolution cache comprises a network address associated with the second device, a plurality of link layer addresses that correspond to a plurality of network interfaces associated with the second device, and route information associated with the second device;
   determining a destination link layer address for the corresponding destination network interface associated with the second device; and
   transmitting the first message via the transmission route to the destination link layer address.

2. The method of claim 1, wherein
   said determining the transmission route comprises determining a source network interface of the first device and the corresponding destination network interface of the second device.

3. The method of claim 1, wherein said determining the transmission route is based, at least in part, on a class of traffic associated with the first message, wherein entries in the address resolution cache include information about classes of traffic associated with the entries.

4. The method of claim 1, wherein the address resolution cache is associated with a hybrid networking sub-layer of the first device, the address resolution cache different from an address resolution protocol table of an upper protocol layer above the hybrid networking sub-layer.

5. The method of claim 1, wherein the route information associated with the second device comprises at least one member from a group consisting of:
   network topology information obtained from a topology message protocol,
   a previously selected transmission route for transmitting communications between the first device and the second device, and
   route metric information associated with one or more transmission routes between the first device and the second device.

6. The method of claim 1, further comprising:
   receiving a second message at the first device from the second device, wherein the second message indicates the plurality of link layer addresses that correspond to the plurality of network interfaces associated with the second device; and
   updating the address resolution cache to reflect the plurality of link layer addresses that correspond to the plurality of network interfaces associated with the second device.

7. The method of claim 1, wherein the address resolution cache includes information obtained from two or more of:
   an address resolution protocol (ARP) response message received from the second device in response to an ARP request message from the first device to the second device,
   an ARP announcement message, or
   a topology message indicating the plurality of link layer addresses that correspond to the plurality of network interfaces associated with the second device.

8. The method of claim 1, wherein the destination link layer address is an identifier associated with a hybrid networking sub-layer of the second device.

9. The method of claim 1, further comprising:
   determining whether the address resolution cache comprises one or more address resolution store entries associated with the second device;
   in response to determining that the first device does not comprise the one or more address resolution store entries associated with the second device,
      transmitting, from the first device to the second device, a request for at least one of the plurality of link layer addresses associated with the second device; and
      creating the one or more address resolution store entries associated with the second device based, at least in part, on one or more responses received from the second device in response to said transmitting the request for at least one of the plurality of link layer addresses associated with the second device.

10. The method of claim 1, further comprising:
    receiving, at a hybrid networking sub-layer of the first device, the first message from an upper protocol layer above the hybrid networking sub-layer, the first message including a first link layer address of the second device based, at least in part, on an address resolution protocol (ARP) table associated with the upper protocol layer;

determining the transmission route and the corresponding destination network interface using the address resolution cache at the hybrid networking sub-layer, the address resolution cache different from the ARP table; and replacing the first link layer address in the first message with the destination link layer address in response to determining that the first link layer address is different from the destination link layer address.

11. The method of claim 10,
wherein the ARP table comprises the network address of the second device and the first link layer address associated with the second device in accordance with a legacy ARP,
wherein the address resolution cache comprises the plurality of link layer addresses associated with the second device and the route information for selecting one of the plurality of link layer addresses.

12. The method of claim 11, wherein the first link layer address in the ARP table is a preferred link layer address associated with a preferred transmission route between the first device and the second device or an identifier associated with a second hybrid networking sub-layer of the second device.

13. The method of claim 11, wherein the route information associated with the second device comprises at least one member from a group consisting of:
network topology information obtained from a topology message protocol,
a previously selected transmission route for transmitting communications between the first device and the second device, and
route metric information associated with one or more transmission routes between the first device and the second device.

14. The method of claim 1, wherein the destination link layer address is one of:
a first link layer address associated with a first network interface of the second device,
a second link layer address associated with a second network interface of the second device, or
an identifier associated with a hybrid networking sub-layer of the second device.

15. The method of claim 1, wherein the address resolution cache includes an entry for a first network interface of the second device, the method further comprising, deleting the entry in response to at least one of:
determining that no communications were received from the first network interface of the second device during a predetermined time interval;
determining that the entry was not used in a previous transmission route to the second device during a predetermined aging time interval; or
determining that a timestamp associated with the entry is expired.

16. The method of claim 1, further comprising:
receiving a cancel association message from the second device indicating that a first link layer address associated with the second device is not valid; and
updating the address resolution cache to remove the first link layer address associated with the second device.

17. The method of claim 1, wherein the route information comprises at least one member of a group consisting of network topology information, route metric information, and selection history information.

18. The method of claim 1, wherein determining the transmission route comprises determining a previous transmission route for a previous message from the first device to the second device, the method further comprising:
maintaining selection history information that indicates a last used entry in the address resolution cache for determining the previous transmission route.

19. The method of claim 18, wherein the selection history information includes a class associated with the last used entry in the address resolution cache for determining the previous transmission route.

20. A method performed by a first device of a communication network, the method comprising:
receiving, at a hybrid networking sub-layer of the first device, an address resolution protocol (ARP) request from an upper protocol layer of the first device, the ARP request for a link layer address associated with a second device of the communication network;
determining whether an address resolution cache of the hybrid networking sub-layer has at least one link layer address associated with the second device;
in response to determining that the hybrid networking sub-layer of the first device has at least one link layer address associated with the second device,
providing, to the upper protocol layer of the first device, a first response message in response to the ARP request, the first response message including a first link layer address associated with the second device; and
discarding the ARP request at the hybrid networking sub-layer without transmitting the ARP request to the second device; and
in response to determining that the hybrid networking sub-layer of the first device does not have at least one link layer address associated with the second device,
transmitting the ARP request to the second device;
receiving, at the hybrid networking sub-layer of the first device, one or more response messages from the second device in response to the ARP request;
determining the first link layer address based, at least in part, on the one or more response messages received from the second device; and
generating and providing the first response message to the upper protocol layer of the first device, wherein the first response message includes the first link layer address associated with the second device.

21. The method of claim 20, wherein transmitting the ARP request to the second device comprises one of:
modifying the ARP request received from the upper protocol layer and transmitting the modified ARP request to the second device; or
discarding the ARP request received from the upper protocol layer and transmitting a new ARP request to the second device.

22. The method of claim 20, wherein the first link layer address comprises one of:
a preferred link layer address associated with a preferred transmission route between the first device and the second device,
an identifier associated with a second hybrid networking sub-layer of the second device, or
one of a plurality of link layer addresses of the second device.

23. The method of claim 20, further comprising, in response to determining that the hybrid networking sub-layer of the first device does have at least one link layer address associated with the second device:

generating a new entry in the address resolution cache, the new entry including a network layer address associated with the second device and a null link layer address; and updating the new entry based, at least in part, on a responding link layer address in the one or more response messages received from the second device, said updating comprising replacing the null link layer address with the responding link layer address.

24. A first device comprising:

a processor; and memory storing instructions which, when executed by the processor, cause the first device to:

determine a transmission route and a corresponding destination network interface associated with a second device, the transmission route for a first message to be transmitted from the first device to the second device via a communication network, wherein the transmission route is determined based, at least in part, on an address resolution cache, and wherein the address resolution cache comprises a network address associated with the second device, a plurality of link layer addresses that correspond to a plurality of network interfaces associated with the second device, and route information associated with the second device;

determine a destination link layer address for the corresponding destination network interface associated with the second device; and transmit the first message via the transmission route to the destination link layer address.

25. The first device of claim 24, wherein the address resolution cache is associated with a hybrid networking sub-layer of the first device, the address resolution cache different from an address resolution protocol (ARP) table of an upper protocol layer above the hybrid networking sub-layer.

26. The first device of claim 24, wherein the instructions, when executed by the processor, cause the first device:

receive a second message from the second device, wherein the second message indicates the plurality of link layer addresses that correspond to the plurality of network interfaces associated with the second device; and update the address resolution cache to reflect the plurality of link layer addresses that correspond to the plurality of network interfaces associated with the second device.

27. The first device of claim 24, wherein the destination link layer address is an identifier associated with a hybrid network sub-layer of the second device.

28. The first device of claim 24, wherein the instructions, when executed by the processor, cause the first device to:

receive, at a hybrid networking sub-layer of the first device, the first message from an upper protocol layer above the hybrid networking sub-layer, the first message including a first link layer address of the second device based, at least in part, on an address resolution protocol (ARP) table associated with the upper protocol layer;

determine the transmission route and the corresponding destination network interface using the address resolution cache at the hybrid networking sub-layer, the address resolution cache different from the ARP table; and replace the first link layer address in the first message with the destination link layer address in response to the first device determining that the first link layer address is different from the destination link layer address.

29. The first device of claim 28, wherein the ARP table comprises the network address of the second device and the first link layer address associated with the second device in accordance with a legacy ARP, wherein the address resolution cache comprises the plurality of link layer addresses associated with the second device and the route information for selecting one of the plurality of link layer addresses.

30. The first device of claim 29, wherein the first link layer address in the ARP table is a preferred link layer address associated with a preferred transmission route between the first device and the second device or an identifier associated with a second hybrid networking sub-layer of the second device.

31. The first device of claim 28, wherein the route information associated with the second device comprises at least one member from a group consisting of for one or more of:

network topology information obtained from a topology message protocol, a previously selected transmission route for transmitting communications between the first device and the second device, and route metric information associated with one or more transmission routes between the first device and the second device.

32. The first device of claim 23, wherein the instructions, when executed by the processor, cause the first device to:

receive a cancel association message from the second device indicating that a first link layer address associated with the second device is not valid; and update the address resolution cache to remove the first link layer address associated with the second device.

33. A first device comprising:

a processor; and memory storing instructions which, when executed by the processor, cause the first device to:

receive, at a hybrid networking sub-layer of the first device, an address resolution protocol (ARP) request from an upper protocol layer of the first device, the ARP request for a link layer address associated with a second device of a communication network;

determine whether an address resolution cache of the hybrid networking sub-layer has at least one link layer address associated with the second device;

in response to determining that the hybrid networking sub-layer of the first device has at least one link layer address associated with the second device, provide, to the upper protocol layer of the first device, a first response message in response to the ARP request, the first response message including a first link layer address associated with the second device; and discard the ARP request at the hybrid networking sub-layer without transmitting the ARP request to the second device; and in response to determining that the hybrid networking sub-layer of the first device does not have at least one link layer address associated with the second device, transmit the ARP request to the second device;

receive one or more response messages from the second device in response to the ARP request;

determining the first link layer address based, at least in part, on the one or more response messages received from the second device; and generate and provide the first response message to the upper protocol layer of the first device, wherein the first response message includes the first link layer address associated with the second device.

34. The first device of claim 32, wherein the instructions, when executed by the processor, cause the first device to: in response to determining that the hybrid network sub-layer of the first device does not have at least one link layer address associated with the second device:
generate a new entry in the address resolution cache, the new entry including a network layer address associated with the second device and a null link layer address; and
update the new entry based, at least in part, on a responding link layer address in the one or more response messages received from the second device, the instructions causing the first device to
replace the null link layer address with the responding link layer address.

35. A non-transitory machine-readable medium having instructions stored therein which, when executed by a processor, cause the processor to perform operations that comprise:
determining a transmission route and a corresponding destination network interface associated with a second device, the transmission route for a first message to be transmitted from a first device to the second device via a communication network, wherein the transmission route is determined based, at least in part, on an address resolution cache, and wherein the address resolution cache comprises a network address associated with the second device, a plurality of link layer addresses that correspond to a plurality of network interfaces associated with the second device, and route information associated with the second device;
determining a destination link layer address for the corresponding destination network interface associated with the second device; and
transmitting the first message via the transmission route to the destination link layer address.

36. The non-transitory machine-readable medium of claim 35, further comprising instructions stored therein which, when executed by the processor, cause the processor to perform operations that comprise:
receiving, at a hybrid networking sub-layer of the first device, the first message from an upper protocol layer above the hybrid networking sub-layer, the first message including a first link layer address of the second device based, at least in part, on an address resolution protocol (ARP) table associated with the upper protocol layer;
wherein determining the transmission route comprises determining the transmission route and the corresponding destination network interface using the address resolution cache at the hybrid networking sub-layer, the address resolution cache different from the ARP table; and
replacing the first link layer address in the first message with the destination link layer address in response to determining that the first link layer address is different from the destination link layer address.

37. The non-transitory machine-readable medium of claim 36,
wherein the ARP table comprises the network address of the second device and the first link layer address associated with the second device in accordance with a legacy ARP,
wherein the address resolution cache comprises the plurality of link layer addresses associated with the second device and the route information for selecting one of the plurality of link layer addresses.

38. A non-transitory machine-readable medium having instructions stored therein which, when executed by a processor, cause the processor to perform operations that comprise:
receiving, at a hybrid networking sub-layer of a first device, an address resolution protocol (ARP) request from an upper protocol layer of the first device, the ARP request for a link layer address associated with a second device of a communication network;
determining whether an address resolution cache of the hybrid networking sub-layer has at least one link layer address associated with the second device;
in response to determining that the hybrid networking sub-layer has at least one link layer address associated with the second device,
providing, to the upper protocol layer of the first device, a first response message in response to the ARP request, the first response message including a first link layer address associated with the second hybrid device; and
discarding the ARP request at the hybrid networking sub-layer without transmitting the ARP request to the second device; and
in response to determining that the hybrid networking sub-layer of the first device does not have at least one link layer address associated with the second device,
transmitting the ARP request to the second device;
receiving, at the hybrid networking sub-layer of the first device, one or more response messages from the second device in response to the ARP request;
determining the first link layer address based, at least in part, on the one or more response messages received from the second hybrid device; and
generating and providing the first response message to the upper protocol layer of the first device, wherein the first response message includes the first link layer address associated with the second device.

39. The non-transitory machine-readable medium of claim 38, further comprising instructions which, when executed by the processor, cause the processor to perform operations that comprise:
generating a new entry in the address resolution cache, the new entry including a network layer address associated with the second device and a null link layer address; and
updating the new entry based, at least in part, on a responding link layer address in the one or more response messages received from the second device, said updating comprising
replacing the null link layer address with the responding link layer address.

* * * * *